United States Patent
Takahashi et al.

(10) Patent No.: US 8,098,361 B2
(45) Date of Patent: Jan. 17, 2012

(54) LIQUID CRYSTAL DISPLAY DEVICE AND METHOD FOR MANUFACTURING THE SAME

(75) Inventors: Erika Takahashi, Kanagawa (JP); Gen Fujii, Kanagawa (JP); Shuji Fukai, Kanagawa (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 162 days.

(21) Appl. No.: 12/258,866

(22) Filed: Oct. 27, 2008

(65) Prior Publication Data

US 2009/0109388 A1   Apr. 30, 2009

(30) Foreign Application Priority Data

Oct. 30, 2007  (JP) ................. 2007-281124

(51) Int. Cl.
*G02F 1/1333* (2006.01)

(52) U.S. Cl. ........................................ 349/158

(58) Field of Classification Search .................. None
See application file for complete search history.

(56) References Cited

U.S. PATENT DOCUMENTS

| | | | |
|---|---|---|---|
| 4,874,461 A | 10/1989 | Sato et al. | |
| 4,924,243 A | 5/1990 | Sato et al. | |
| 5,379,139 A | 1/1995 | Sato et al. | |
| 5,486,941 A | 1/1996 | Saiuchi et al. | |
| 7,399,704 B2 | 7/2008 | Fujii et al. | |
| 7,605,903 B2 | 10/2009 | Nonaka | |
| 2005/0170565 A1 | 8/2005 | Fujii et al. | |
| 2006/0158602 A1 | 7/2006 | Toyoda | |
| 2007/0146617 A1* | 6/2007 | Nonaka | 349/155 |
| 2008/0204645 A1* | 8/2008 | Kawabe et al. | 349/123 |
| 2009/0086152 A1* | 4/2009 | Seo et al. | 349/155 |

FOREIGN PATENT DOCUMENTS

| | | |
|---|---|---|
| CN | 1808227 A | 7/2006 |
| CN | 1991532 A | 7/2007 |
| JP | 11-024083 | 1/1999 |
| JP | 11-352495 | 12/1999 |
| JP | 11-352495 A | 12/1999 |
| JP | 2001-083314 | 3/2001 |
| JP | 2001-083314 A | 3/2001 |
| JP | 2002-372717 | 12/2002 |

OTHER PUBLICATIONS

Office Action (Chinese Patent Application No. 200810173990.3; mailed Jul. 26, 2011 (translation to follow).
Chinese Application No. 200810173990.3 Office Action mailed Jul. 26, 2011, 12 pages.

* cited by examiner

*Primary Examiner* — Sung Pak
(74) *Attorney, Agent, or Firm* — Fish & Richardson P.C.

(57) ABSTRACT

To control the positioning of a spacer more accurately in a liquid crystal display device to prevent display defects due to incorrect positioning in a display region. To provide a liquid crystal display device with higher image quality and reliability, and to provide a method for manufacturing the liquid crystal display device with high yield. In a liquid crystal display device, a region onto which a spherical spacer is discharged is subjected to liquid-repellent treatment in order to reduce the wettability with respect to a liquid in which the spherical spacer is dispersed. The liquid (the droplet) does not spread over the liquid-repellent region and is dried while moving the spherical spacer toward the center of the liquid. Thus, incorrect positioning shortly after discharging, which has been caused by the loss of control in the liquid, can be corrected by moving the spherical spacer while drying the liquid.

35 Claims, 18 Drawing Sheets

FIG. 1A1
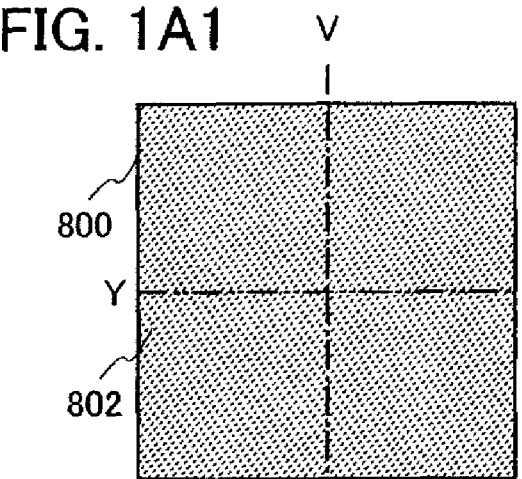
FIG. 1A2
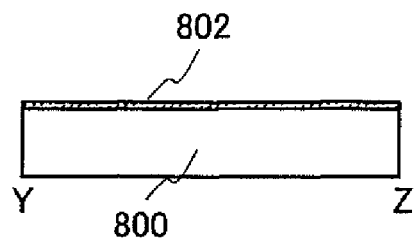
FIG. 1B1
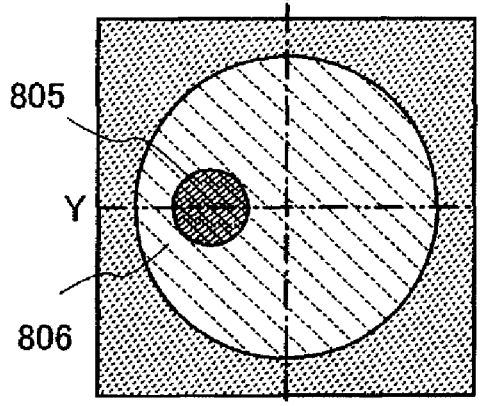
FIG. 1B2
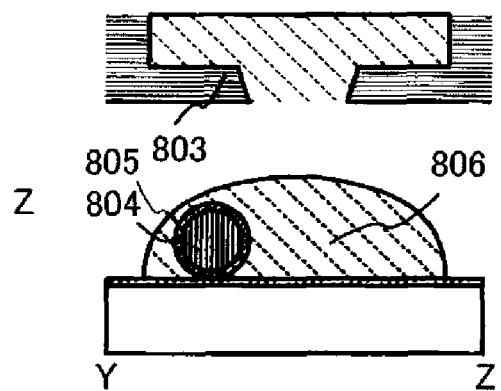
FIG. 1C1
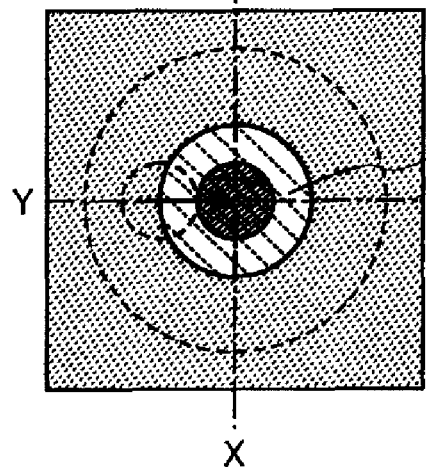
FIG. 1C2
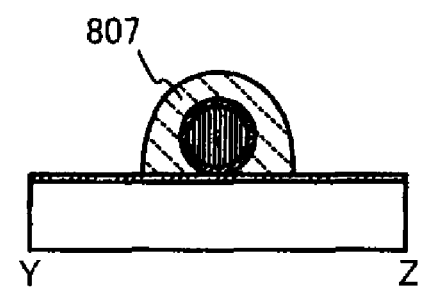

FIG. 2A1 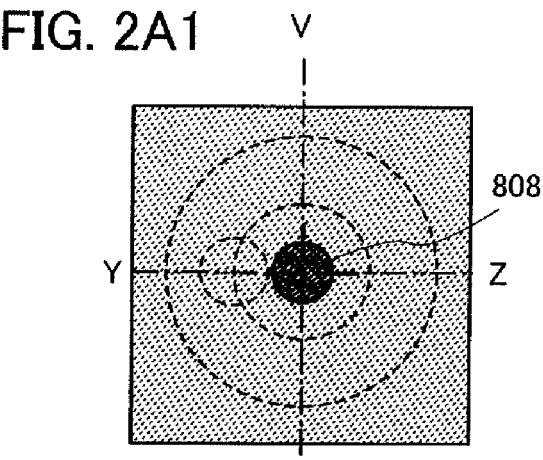
FIG. 2A2 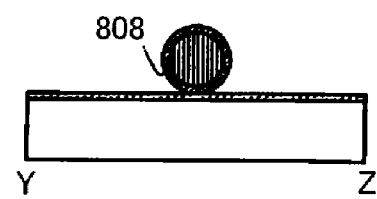
FIG. 2B1 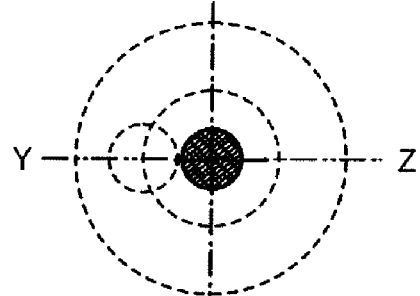
FIG. 2B2 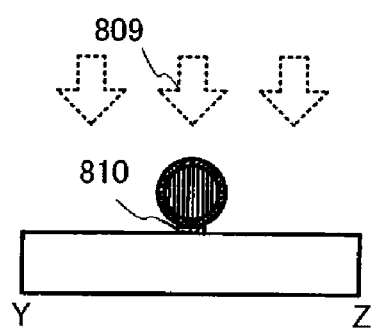
FIG. 2C1 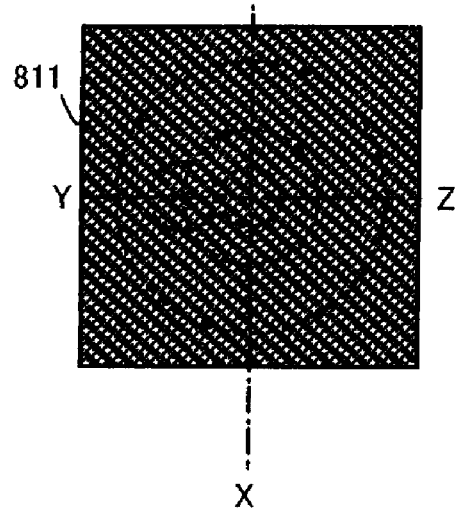
FIG. 2C2 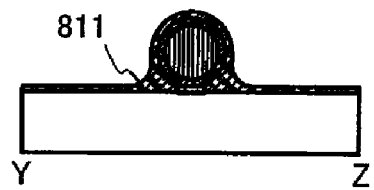

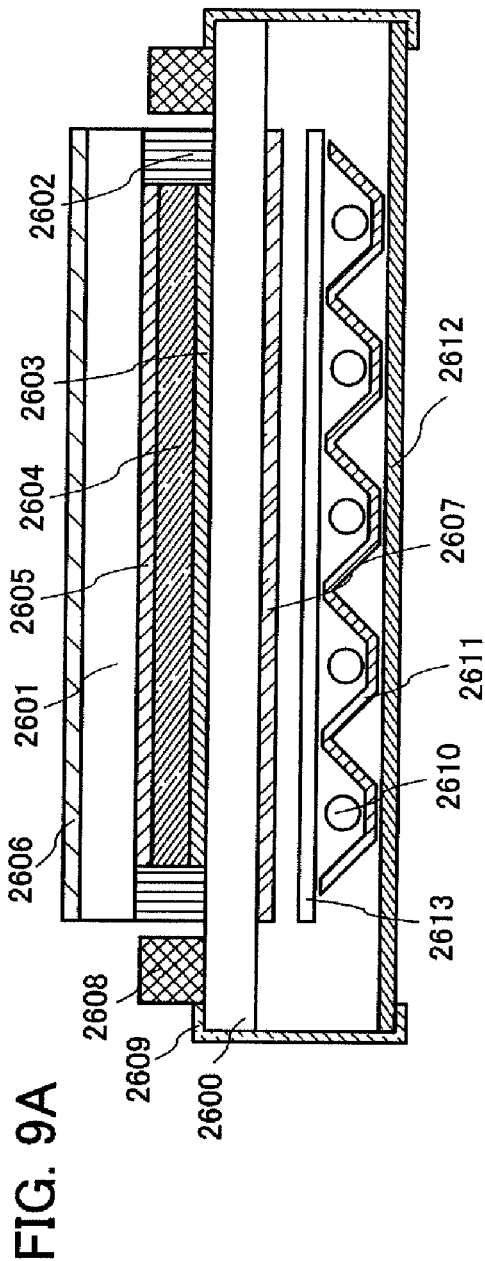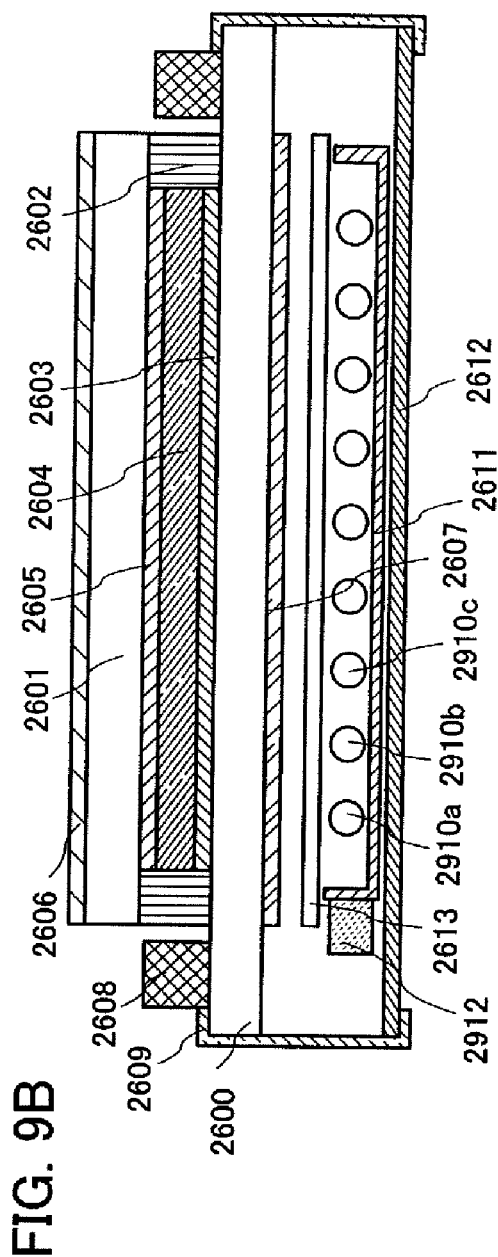

US 8,098,361 B2

LIQUID CRYSTAL DISPLAY DEVICE AND METHOD FOR MANUFACTURING THE SAME

BACKGROUND OF THE INVENTION

1. Field of the Invention

The present invention relates to a method for manufacturing a liquid crystal display device including a spacer.

2. Description of the Related Art

In a liquid crystal display device, in order to maintain the space (the gap) between substrates and control the thickness of a liquid crystal layer (cell gap), a columnar or spherical (bead) spacer is used.

Typically, a columnar spacer is formed in such a manner that a photosensitive resin is applied by spin coating or the like and processed into a columnar shape by a photolithography process. In that case, it is possible to control the position where a columnar spacer is formed in a liquid crystal display device, but it is difficult to uniformly control the thickness of the columnar spacer, which determines the thickness of a liquid crystal layer. In addition, the use of the photolithography process leads to low material-use efficiency, increased cost, and decreased productivity.

A spherical spacer (also referred to as a bead spacer) is generally dispersed in a liquid crystal display device by a distributor (for example, see Patent Document 1: Japanese Published Patent Application No. H11-352495). In a conventional method for providing a spacer, as illustrated in a flow chart of FIG. 4, an insulating layer functioning as an alignment film is formed, rubbing treatment is performed, a spherical spacer is dispersed by a dispersing method, substrates are attached to each other, and heat treatment is performed to fix the spherical spacer with an adhesive. However, in the conventional method illustrated in FIG. 4, it is difficult to control the position where the spherical spacer is arranged, and thus the spherical spacer is also provided in a display region. Accordingly, there may occur display defects such as damage due to movement of the spherical spacer, light leakage, and alignment disorder on the periphery of the spherical spacer. In order to control the position where a spherical spacer is arranged, it has been reported that a bead spacer is positioned by an ink jet method (for example, see Patent Document 2: Japanese Published Patent Application No. 2002-372717).

SUMMARY OF THE INVENTION

However, in the aforementioned ink jet method, the position of a spherical spacer cannot be controlled in a droplet discharged onto a substrate, and thus there are variations in the position where the spacer is discharged, which has made it difficult to accurately control the positioning.

Accordingly, it is an object of the present invention to control the positioning of a spacer more accurately in a liquid crystal display device to prevent display defects due to incorrect positioning in a display region. It is another object of the present invention to provide a liquid crystal display device with higher image quality and reliability, and to provide a method for manufacturing the liquid crystal display device with high yield.

In a liquid crystal display device, in order to maintain the space (the gap) between substrates and control the thickness of a liquid crystal layer, a spherical (bead) spacer is positioned by a droplet discharge method (also referred to as an ink jet method). A region onto which a spherical spacer is discharged is subjected to liquid-repellent treatment in order to reduce the wettability with respect to a liquid (also referred to as a dispersion medium) in which the spherical spacer is dispersed. As a result of the liquid-repellent treatment, the liquid (the droplet) in which the spherical spacer is dispersed lands on a liquid-repellent treatment region while maintaining a large contact angle with respect to the liquid-repellent treatment region. The liquid does not spread over the liquid-repellent region and is dried while moving the spherical spacer toward the center of the liquid. Therefore, the spherical spacer can be positioned in the center of the liquid, which is the position where the liquid is controlled to be discharged. Thus, incorrect positioning shortly after discharging, which has been caused by the loss of control in the droplet, can be corrected by moving the spherical spacer while drying the droplet.

The liquid-repellent treatment can be performed by forming an organosilane film having a hydrolytic group over a region (a substrate or a conductive layer) where a spherical spacer is positioned. Before the liquid-repellent treatment, ultraviolet irradiation treatment may be performed in an atmosphere containing oxygen in order to remove organic impurities.

In the present invention, by using a spherical spacer attached with an adhesive, in which the adhesive with a substrate is provided on the periphery of the spherical spacer, heat treatment can be performed after drying a liquid and the spherical spacer can be fixed to a substrate (a conductive layer) with the adhesive. In this specification, the phrase "a spherical spacer is fixed to a substrate" means that the spacer is fixed over the substrate, and includes the case where an organosilane film or the like used for the liquid-repellent treatment is provided between the substrate and the spacer.

Since a spherical spacer easily moves, it is often positioned over an insulating layer functioning as an alignment film. However, in the present invention, an insulating layer functioning as an alignment film is formed over a spherical spacer that is positioned over a substrate and fixed thereto, and then subjected to rubbing treatment; thus, the spherical spacer can be positioned in a liquid crystal display device with high positioning accuracy.

Note that an organosilane film having a hydrolytic group, which is used for the liquid-repellent treatment, is removed before forming an insulating layer functioning as an alignment film. The removing may be performed by ultraviolet irradiation treatment in an oxygen atmosphere or ashing treatment using oxygen.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

In addition, the use of a droplet discharge method makes it possible to reduce expensive equipment such as a large vacuum apparatus, and thus high material-use efficiency, decreased cost, and increased productivity can be achieved.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

According to an aspect of a method for manufacturing a display device of the present invention, an organosilane film having a hydrolytic group is formed over a substrate. A liquid in which a spherical spacer attached with an adhesive is dispersed is discharged onto the organosilane film having a hydrolytic group. The liquid that is a dispersion medium is dried to move the spherical spacer. The spherical spacer attached with an adhesive is subjected to heat treatment so that the spherical spacer is fixed to the substrate with the adhesive. The organosilane film having a hydrolytic group is selectively removed using as a mask the spherical spacer fixed to the substrate. An insulating layer functioning as an alignment film is formed over the substrate over which the organosilane film having a hydrolytic group is selectively removed and to which the spherical spacer is fixed.

According to another aspect of the method for manufacturing a display device of the present invention, a conductive layer is formed over a substrate. An organosilane film having a hydrolytic group is formed over the conductive layer. A liquid in which a spherical spacer attached with an adhesive is dispersed is discharged onto the organosilane film having a hydrolytic group. The liquid that is a dispersion medium is dried to move the spherical spacer. The spherical spacer attached with an adhesive is subjected to heat treatment so that the spherical spacer is fixed to the substrate with the adhesive. The organosilane film having a hydrolytic group is selectively removed using as a mask the spherical spacer fixed to the substrate. An insulating layer functioning as an alignment film is formed over the substrate over which the organosilane film having a hydrolytic group is selectively removed and to which the spherical spacer is fixed.

In the aforementioned structures, in the case of a transmissive liquid crystal display device using a light source (such as a backlight), a pair of substrates may have a light transmitting property so as to transmit light from the light source to a viewing side. On the other hand, in the case of a reflective liquid crystal display device, one of electrodes provided over a pair of substrates may have a light reflecting property, and for example, a pixel electrode layer may be formed of a reflective material.

A substrate onto which a spherical spacer is discharged may be a counter substrate or an element substrate provided with semiconductor elements and the like. A liquid crystal layer may be formed by an injecting method or a dropping method.

In the step of positioning a spherical spacer, the spherical spacer is discharged by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

In addition, the use of a droplet discharge method makes it possible to reduce expensive equipment such as a large vacuum apparatus, and thus high material-use efficiency, decreased cost, and increased productivity can be achieved.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

BRIEF DESCRIPTION OF THE DRAWINGS

In the accompanying drawings:

FIGS. 1A1 to 1C2 are conceptual diagrams illustrating an aspect of the present invention;

FIGS. 2A1 to 2C2 are conceptual diagrams illustrating an aspect of the present invention;

FIGS. 9A and 9B are cross-sectional views each illustrating a liquid crystal display module according to an aspect of the present invention;

DETAILED DESCRIPTION OF THE INVENTION

Figure 3:
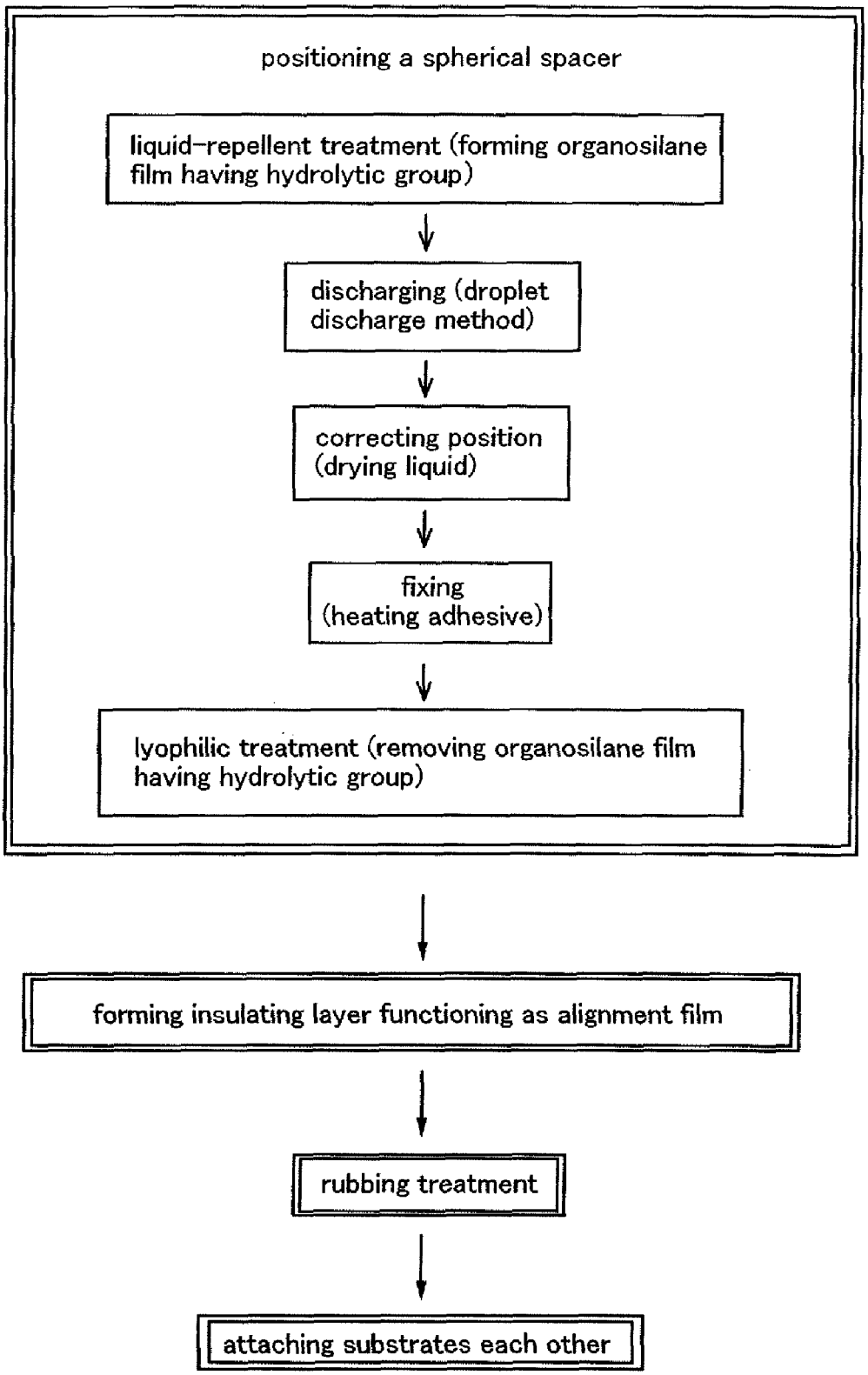
FIG. 3 is a diagram illustrating a method for positioning a spherical spacer according to an aspect of the present invention.
Figure 4:
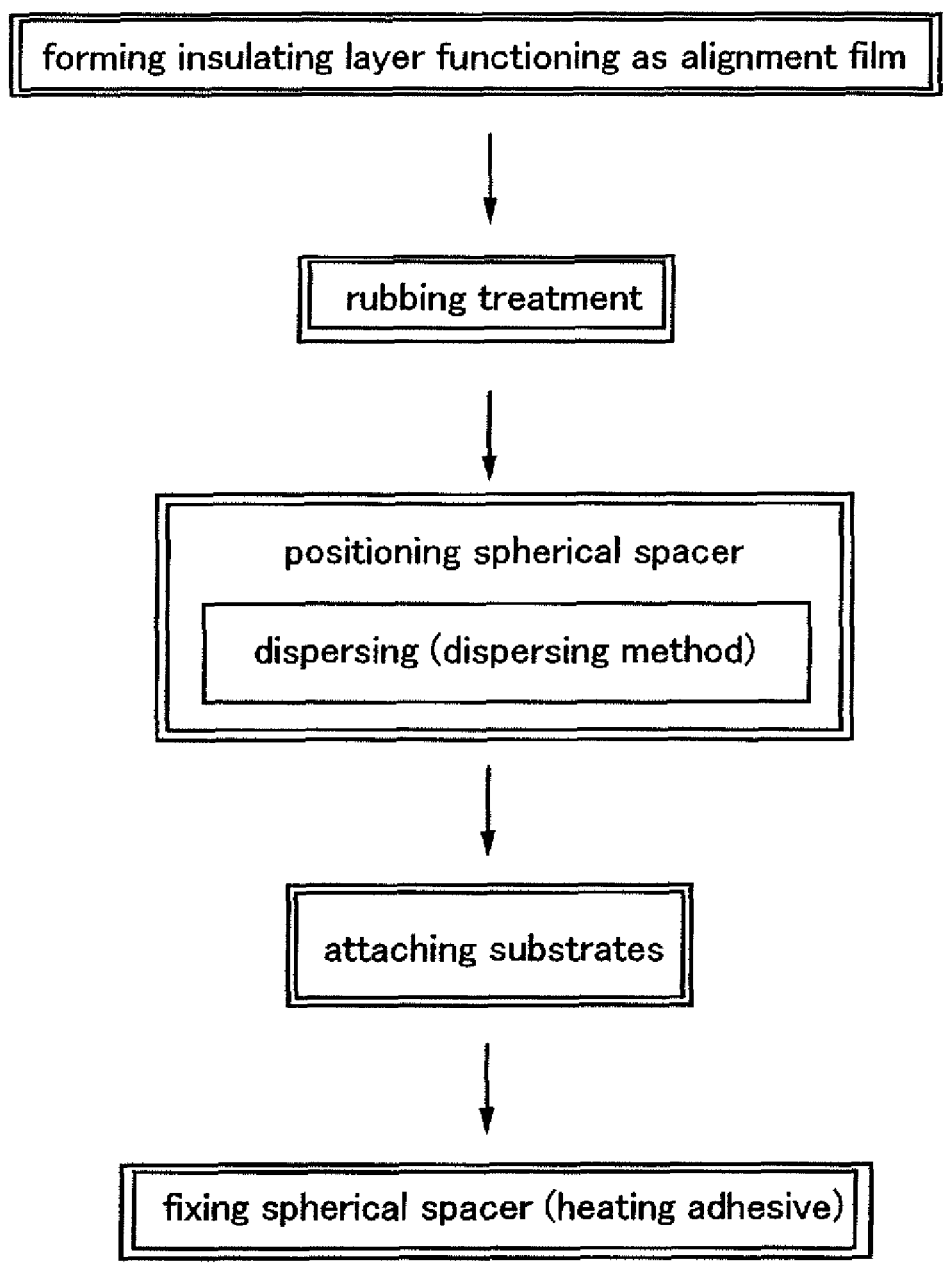
FIG. 4 is a diagram illustrating a conventional method for positioning a spherical spacer.

Although the embodiment modes of the present invention will be described below with reference to the accompanying drawings, it is to be understood that various changes and modifications will be apparent to those skilled in the art. Therefore, unless such changes and modifications depart from the spirit and the scope of the present invention, they should be construed as being included therein. In all the drawings for describing the embodiment modes, the identical portions or portions having a similar function are denoted by the identical reference numerals, and description thereof is omitted.

Embodiment Mode 1

Described in this embodiment mode is an example of a liquid crystal display device that is improved in image quality and reliability and can be manufactured with high yield.

FIG. 3 illustrates a manufacturing process of a liquid crystal display device of the present invention. As illustrated in FIG. 3, in a method for manufacturing a liquid crystal display device, a spherical spacer is positioned over a substrate (or a conductive layer) by a droplet discharge method, an insulating layer functioning as an alignment film is formed thereover, rubbing treatment is performed, and then substrates are attached to each other. In the step of positioning the spherical spacer, first, an organosilane film having a hydrolytic group is formed as liquid-repellent treatment, and a liquid containing the spherical spacer attached with an adhesive is discharged by a droplet discharge method. As the liquid is dried, the spherical spacer moves toward the center of the liquid and the positioning thereof is corrected. Subsequently, the adhesive is heated to fix the spherical spacer, the organosilane film having a hydrolytic group is removed, and lyophilic treatment is performed.

FIGS. 1A1 to 1C2 and FIGS. 2A1 to 2C2 illustrate in detail a method for positioning a spacer in the manufacturing process of a liquid crystal display device using the present invention. FIGS. 1A1, 1B1, and 1C1 and FIGS. 2A1, 2B1, and 2C1 are plan views, and FIGS. 1A2, 1B2, and 1C2 and FIGS. 2A2, 2B2, and 2C2 are cross-sectional views along line Y-Z of FIGS. 1A1, 1B1, and 1C1 and FIGS. 2A1, 2B1, and 2C1, respectively. Line V-X of FIGS. 1A1, 1B1, and 1C1 and FIGS. 2A1, 2B1, and 2C1 is a position where a spacer is to be arranged, and the position where a spacer is discharged by a droplet discharge method is controlled in accordance with the line V-X.

In this embodiment mode, in order to maintain the space (the gap) between substrates and control the thickness of a liquid crystal layer, a spherical (bead) spacer is positioned in a liquid crystal display device by a droplet discharge method (also referred to as an ink jet method). FIGS. 1A1 to 1C2 and FIGS. 2A1 to 2C2 illustrate an example of positioning a spherical spacer over a substrate 800.

First, the substrate 800 onto which a spherical spacer is discharged is subjected to liquid-repellent treatment in order to reduce the wettability with respect to a liquid in which the spherical spacer is dispersed.

The liquid-repellent treatment is performed in such a manner that an organosilane film 802 having a hydrolytic group is formed over the substrate 800 onto which a spherical spacer is discharged (see FIGS. 1A1 and 1A2).

Before forming the organosilane film 802 having a hydrolytic group, ultraviolet irradiation treatment may be performed in an atmosphere containing oxygen in order to remove organic impurities on the substrate 800.

A liquid 806 including a spherical spacer 804 attached with an adhesive 805 is discharged from a droplet discharge apparatus 803 onto the organosilane film 802 having a hydrolytic group, which has liquid repellency (see FIGS. 1B1 and 1B2).

By using the spherical spacer attached with the adhesive, in which the adhesive with the substrate is provided on the periphery of the spherical spacer, heat treatment can be performed after drying a droplet and the spherical spacer can be fixed to the substrate (the conductive layer) with the adhesive.

As a result of the liquid-repellent treatment, the liquid 806 in which the spherical spacer 804 attached with the adhesive 805 is dispersed lands on the organosilane film 802 having a hydrolytic group, which is a liquid-repellent treatment region, while maintaining a large contact angle with respect to the organosilane film 802 having a hydrolytic group. The liquid-repellent treatment makes it possible to reduce the wettability and increase the contact angle with respect to the liquid including the spherical spacer. The liquid including the spherical spacer does not spread over the surface of the region with low wettability and is repelled; thus, the surface is not wetted. A region with low wettability has a low surface energy, while a region with a small contact angle and high wettability has a high surface energy.

Furthermore, in a drying step, a liquid 807 does not spread over the liquid-repellent region and is dried while moving the spherical spacer 804 attached with the adhesive 805 toward the center of the liquid 807 (the arrow direction of FIG. 1C1) (see FIGS. 1C1 and 1C2). Therefore, the spherical spacer 804 can be positioned in the center of the liquid, which is the position where the liquid is controlled to be discharged. Thus, incorrect positioning shortly after discharging, which has been caused by the loss of control in the liquid, can be corrected by moving the spherical spacer while drying the liquid.

After the drying step, heat treatment is performed to bake the spherical spacer 804 attached with the adhesive 805. Through the heat treatment, the spherical spacer 804 is fixed to the substrate 800 with an adhesive 808 (see FIGS. 2A1 and 2A2).

The organosilane film 802 having a hydrolytic group, which is used for the liquid-repellent treatment, may be left or unnecessary portions may be removed after the spherical spacer is fixed. The removing may be performed using the spherical spacer as a mask by ashing using oxygen or the like, etching, plasma treatment, ultraviolet irradiation, or the like. In this embodiment mode, UV rays 809 are applied in an atmosphere containing oxygen so that the organosilane film 802 having a hydrolytic group, which is used for the liquid-repellent treatment, is selectively removed using the spherical spacer 804 as a mask, thereby forming an organosilane film 810 having a hydrolytic group (see FIGS. 2B1 and 2B2).

An insulating layer 811 functioning as an alignment film is formed over the spherical spacer 804 that is fixed to the substrate 800 with the adhesive 808. In this embodiment mode, the insulating layer 811 is formed by a droplet discharge method.

Since the spherical spacer easily moves, it is often positioned over the insulating layer functioning as an alignment film. However, in the present invention, the insulating layer functioning as an alignment film is formed over the spherical spacer that is positioned over the substrate and fixed thereto, and then subjected to rubbing treatment; thus, the spherical spacer can be positioned in a liquid crystal display device with high positioning accuracy.

The insulating layer 811 functioning as an alignment film is subjected to rubbing treatment and attached to a counter substrate. A liquid crystal layer may be formed by a dropping method before the counter substrate is attached, or may be formed by an injecting method after a pair of substrates are attached to each other.

It is confirmed that the spherical spacer can be accurately positioned in a non-display region such as a black matrix (a light shielding film) or a wiring. Accordingly, it is possible to prevent display defects such as damage due to movement of the spherical spacer in a display region, light leakage, and alignment disorder on the periphery of the spherical spacer. Furthermore, the space between the substrates can be maintained more uniformly than in the case of using a columnar spacer the thickness of which is difficult to be controlled at the time of formation.

Although FIGS. 1A1 to 1C2 and FIGS. 2A1 to 2C2 illustrate an example of positioning the spherical spacer over the substrate, the spherical spacer may be provided over a conductive layer functioning as an electrode layer of a liquid crystal element, or an insulating layer functioning as a protective film formed in a display device. Also in the case where the spherical spacer is positioned over the conductive layer or the insulating layer, the positioning of the spherical spacer can be controlled more accurately by applying the liquid-repellent treatment to a region where the spherical spacer is to be positioned.

As a dispersion medium in which the spherical spacer is dispersed, an organic solvent, a mixture of an organic solvent and water, or the like can be used. The dispersion medium needs to have such a viscosity as to be used in a droplet discharge method, and preferably has a viscosity of 3 mPaS or more.

The adhesive may be any of those that can fix the spherical spacer to the substrate (the conductive layer or the insulating film) by heating, and a thermosetting resin cured by heating, or the like can be used.

The organosilane film having a hydrolytic group can be formed using organosilane having a hydrolytic group. Organosilane having a hydrolytic group is represented by the chemical formula: $R_n$—Si—$X_{(4-n)}$ (wherein n=1, 2, 3) or $R_3$—Si—NR—Si—$R_3$. In the formula, R represents a substance having a relatively inactive group such as an alkyl group, and X includes a hydrolytic group that can be bonded by condensation of a hydroxyl group or adsorbed water on a base material surface, such as halogen, a methoxy group, an ethoxy group, or an acetoxy group.

As a typical example of organosilane having a hydrolytic group, organosilane having a fluorine-based hydrolytic group, which has a fluoroalkyl group for R, (fluoroalkylsilane (hereinafter also referred to as FAS)), can be used. R in FAS has a structure represented by $(CF_3)(CF_2)_x(CH_2)_y$ (wherein x is an integer of 0 or more and 10 or less, and y is an integer of 0 or more and 4 or less) and when a plurality of Rs or Xs are bonded with Si, the Rs or Xs may be the same or different. The following can be given as typical FAS: fluoroalkylsilane, such as heptadecafluorotetrahydrodecyltriethoxysilane, heptadecafluorotetrahydrodecyltrichlorosilane, tridecafluorotetrahydrooctyltrichlorosilane, or trifluoropropyltrimethoxysilane.

Needless to say, a substance of organosilane having a hydrolytic group, which does not have a fluorocarbon chain but has an alkyl group, a vinyl group, or an amino group in R may alternatively be used. For example, octadecyltrimethoxysilane (ODS), hexamethyldisilazane (HMDS), vinyltrimethoxysilane, γ-aminopropylethoxysilane, or the like can be used.

As a solvent for organosilane having a hydrolytic group, a hydrocarbon-based solvent, such as n-pentane, n-hexane, n-heptane, n-octane, n-decane, dicyclopentane, benzene, toluene, xylene, durene, indene, tetrahydronaphthalene, decahydronaphthalene, or squalene; tetrahydrofuran; or the like can be used.

In the case where the organosilane film having a hydrolytic group is formed using any of the aforementioned materials, the materials may be chemically adsorbed on a surface of an oxide layer by a gas phase method. A monomolecular layer can be formed by the chemical adsorption. Alternatively, the organosilane film having a hydrolytic group may be formed using any of the aforementioned materials by a droplet discharge method, a coating method, or the like.

In order to obtain a monomolecular layer, a substrate is placed in an airtight container containing organosilane so that organosilane is chemically adsorbed on a surface of an oxide layer, and then washed with alcohol to be a monomolecular film. Thus, organosilane having a hydrolytic group, which is a monomolecular layer, can be obtained. Alternatively, a substrate may be soaked in a solution containing organosilane so that organosilane is chemically adsorbed on a surface of an oxide layer to be a monomolecular film. Thus, organosilane having a hydrolytic group, which is a monomolecular layer, can be obtained.

The organosilane film having a hydrolytic group may be extremely thin depending on its formation conditions, and the film does not necessarily maintain the form of a film.

A thin film can be selectively formed by a droplet discharge method in which a composition can be discharged to form a desired pattern, a printing method in which a composition can be transferred or drawn into a desired pattern, or the like. Therefore, less material is wasted and a material can be efficiently used, which results in reduction in production cost. Furthermore, such methods do not require processing of the shape of the thin film by a photolithography process, and therefore simplifies the process and improves the productivity. In addition, since a liquid composition having fluidity is used to form a thin film, materials can be easily mixed and good coverage with respect to a region where a thin film of the composition is formed can also be achieved.

A droplet discharge means is described with reference to FIG. 17. A droplet discharge means is a general term for an apparatus provided with means that discharges droplets, such as a nozzle including a discharge opening of a composition and a head including one or more nozzles.

Figure 17:
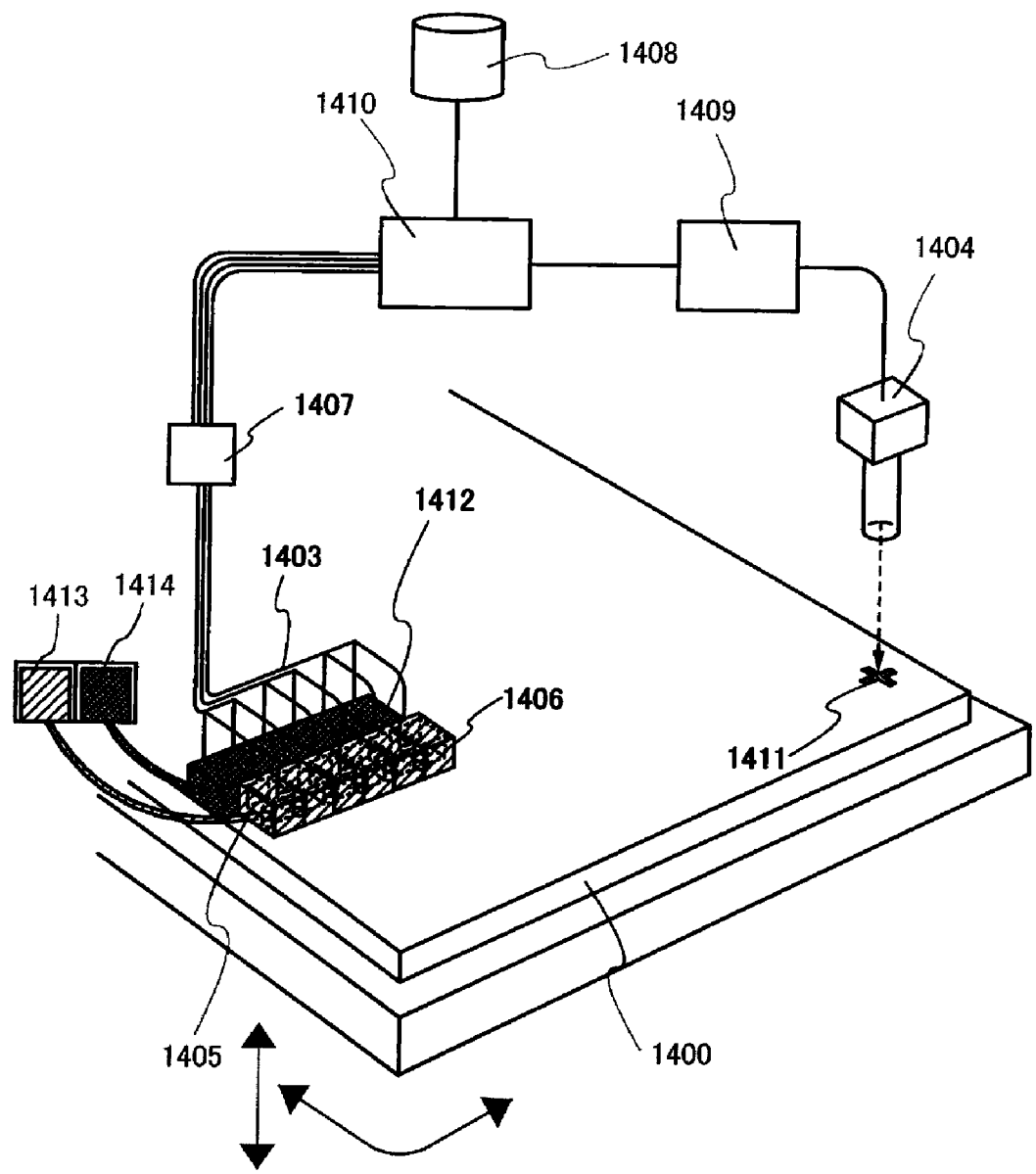
FIG. 17 is a diagram illustrating a droplet discharge apparatus that can be used in a manufacturing process of a display device of the present invention.

FIG. 17 illustrates a mode of a droplet discharge apparatus used in a droplet discharge method. Each of heads 1405 and heads 1412 of a droplet discharge means 1403 is connected to a control means 1407, and this control means 1407 is controlled by a computer 1410, whereby a preprogrammed pattern can be drawn. A position for drawing a pattern may be determined, for example, by determining a reference point by detecting a marker 1411 on a substrate 1400 using an imaging means 1404, an image processing means 1409, and the computer 1410. Alternatively, the reference point may be determined with reference to an edge of the substrate 1400.

As the imaging means 1404, an image sensor or the like using a charge coupled device (CCD) or a complementary metal oxide semiconductor (CMOS) can be used. Naturally, data on a pattern to be formed over the substrate 1400 is stored in a storage medium 1408, and a control signal is transmitted to the control means 1407 based on the data, whereby each of the heads 1405 and 1412 of the droplet discharge means 1403 can be individually controlled. A discharged material is supplied to the heads 1405 and 1412 through pipes from a material source 1413 and a material source 1414, respectively.

Inside the heads 1405, there are a space filled with a liquid material as indicated by a dotted line 1406 and a nozzle serving as a discharge opening. Although not illustrated, the heads 1412 have an internal structure similar to that of the heads 1405. When the heads 1405 and the heads 1412 have nozzles with different sizes, patterns having different widths can be drawn with different materials at the same time. Thus, plural kinds of materials or the like can be discharged from one head to draw a pattern while when a pattern is drawn in a large area, the same material can be discharged from a plurality of nozzles at the same time to improve throughput. In the case of forming a pattern over a large substrate, the heads 1405 and 1412 and a stage provided with the substrate are scanned relatively in the direction of the arrows, and the area of the pattern can be set freely. Accordingly, a plurality of the same patterns can be drawn over one substrate, for example.

Furthermore, a step of discharging the composition may be performed under reduced pressure. The substrate may be heated when the composition is discharged. After the composition is discharged, either or both of steps of drying and baking are performed. Both the drying and baking steps are performed by heat treatment, but they have different purposes, temperatures, and time periods: for example, drying is performed at 80° C. to 100° C. for three minutes and baking is performed at a temperature of 200° C. to 550° C. for 15 minutes to 60 minutes. The steps of drying and baking are performed under normal pressure or under reduced pressure by laser irradiation, rapid thermal annealing, heating using a heating furnace, or the like. Note that the timing of the heat treatment and the number of heat treatment are not especially limited. The conditions for favorably performing the steps of drying and baking, such as temperature and time period, depend on the material of the substrate and properties of the composition.

Furthermore, after a conductive layer, an insulating layer, or the like is formed by discharging a composition by a droplet discharge method, a surface thereof may be pressed with pressure to increase the planarity. As a pressing method, unevenness may be reduced by moving a roller-shaped object over the surface, or the surface may be pressed with a flat plate-shaped object. A heating step may also be performed at the time of the pressing. Alternatively, the unevenness of the surface may be eliminated with an air knife after softening or melting the surface with a solvent or the like. The surface may also be polished by CMP. This process can be applied for planarizing a surface when unevenness is caused by a droplet discharge method.

In the step of positioning a spherical spacer, the spherical spacer is discharged by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

The present invention can be applied to a liquid crystal display device that includes a liquid crystal element as a display element and has a display function. The liquid crystal display device may also refer to a display panel in which a plurality of pixels including display elements such as liquid crystal elements and a peripheral driver circuit for driving the pixels are formed over a substrate. The liquid crystal display device may also include a flexible printed circuit (FPC), a printed wiring board (PWB), an IC, a resistor, a capacitor, an inductor, or a transistor. Furthermore, the liquid crystal display device may include an optical sheet such as a polarizing plate or a retardation plate, and a backlight (that may include a light guide plate, a prism sheet, a diffusion sheet, a reflective sheet, and a light source (e.g., an LED or a cold cathode tube)).

Note that a liquid crystal display device using a liquid crystal element refers to a transmissive liquid crystal display device (a transmissive liquid crystal display), a transflective liquid crystal display device (a transflective liquid crystal display), and a reflective liquid crystal display device (a reflective liquid crystal display).

Embodiment Mode 2

Described in this embodiment mode is an example of a liquid crystal display device that is improved in image quality and reliability and can be manufactured with high yield. More specifically, a passive matrix liquid crystal display device is described.

Figure 5A:
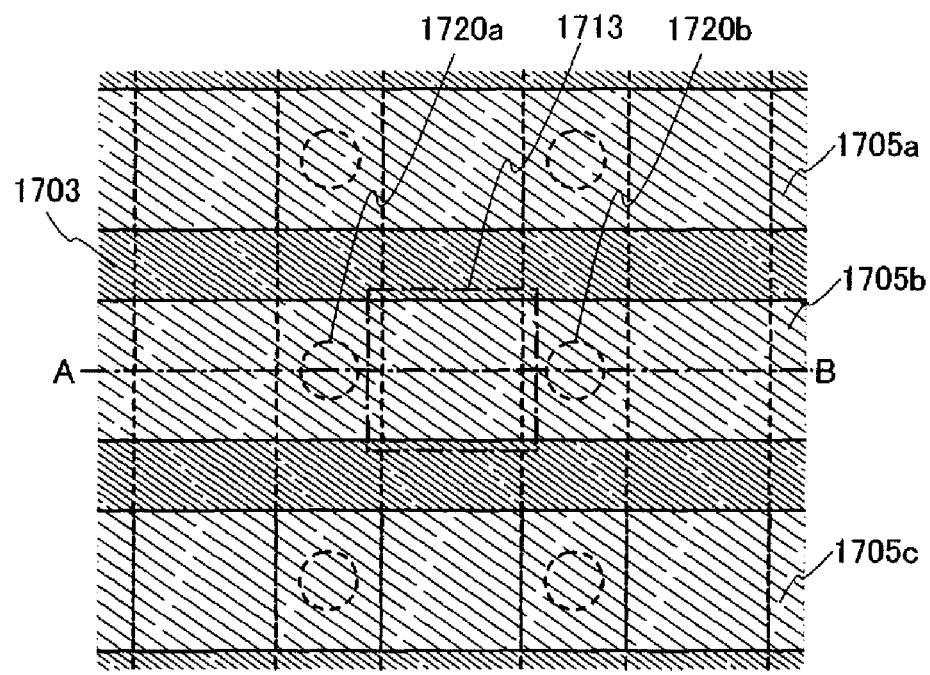
FIGS. 5A and 5B are respectively a top view and a cross-sectional view illustrating a liquid crystal display device according to an aspect of the present invention.
Figure 5B:
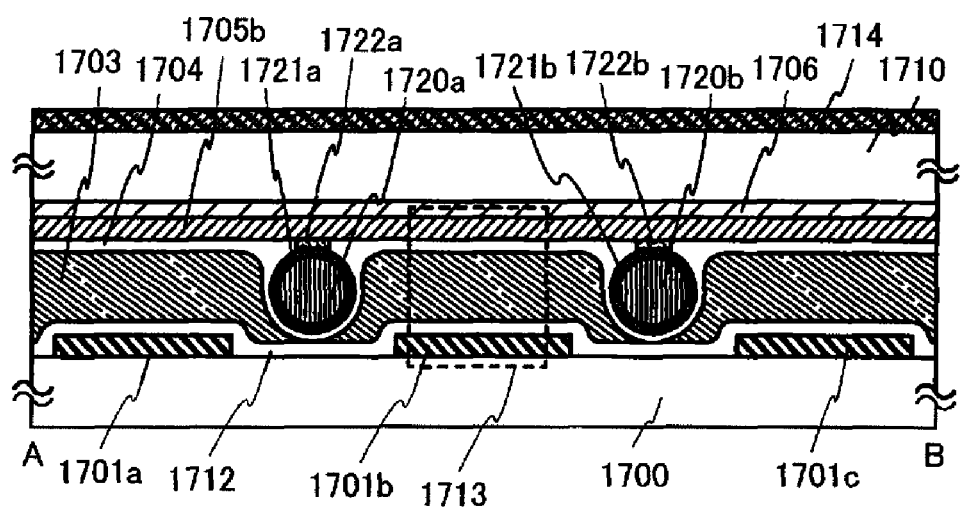

Description is made on a passive matrix liquid crystal display device of this embodiment mode to which the present invention is applied. FIG. 5A is a top view of the liquid crystal display device, and FIG. 5B is a cross-sectional view along line A-B of FIG. 5A. FIG. 5A includes, as illustrated in FIG. 5B, an insulating layer 1704 functioning as an alignment film, a coloring layer, a substrate 1710 that is a counter substrate, a polarizing plate 1714, and the like, although they are omitted and not illustrated in FIG. 5A.

In FIGS. 5A and 5B, a substrate 1700 is provided with pixel electrode layers 1701*a*, 1701*b* and 1701*c* that extend in a first direction, and an insulating layer 1712 functioning as an alignment film. The substrate 1710 is provided with the insulating layer 1704 functioning as an alignment film, counter electrode layers 1705*a*, 1705*b* and 1705*c* that extend in a second direction perpendicular to the first direction, a coloring layer 1706 functioning as a color filter, and the polarizing plate 1714. The substrate 1700 faces the substrate 1710 with a liquid crystal layer 1703 interposed therebetween (see FIGS. 5A and 5B). It is noted that the liquid crystal display device of the present invention includes a liquid crystal element 1713 as a display element. The alignment film refers to an insulating layer in which molecules on its surface are aligned by rubbing treatment or the like. The counter electrode layers 1705*a*, 1705*b* and 1705*c* are provided with spherical spacers 1720*a* and 1720*b* attached with adhesives 1721*a* and 1721*b* respectively with organosilane films 1722*a* and 1722*b* interposed therebetween, respectively.

Also in the method for manufacturing a liquid crystal display device of this embodiment mode, after the spherical spacers 1720*a* and 1720*b* attached with the adhesives 1721*a* and 1721*b* respectively are positioned over the counter electrode layers 1705*a*, 1705*b* and 1705*c* by a droplet discharge method, the insulating layer 1704 functioning as an alignment film is formed, rubbing treatment is performed, and then the substrates are attached to each other. In the step of positioning the spherical spacers, first, an organosilane film having a hydrolytic group is formed as liquid-repellent treatment, and a liquid containing a spherical spacer attached with an adhesive is discharged by a droplet discharge method. As the liquid is dried, the spherical spacer moves toward the center of the liquid and the positioning thereof is corrected. Subsequently, the adhesive is heated to fix the spherical spacer, the organosilane film having a hydrolytic group is selectively removed while leaving the organosilane films 1722*a* and 1722*b* having a hydrolytic group, and lyophilic treatment is performed.

In this embodiment mode, in order to maintain the space between the substrates and control the thickness of the liquid crystal layer, the spherical spacers are positioned in the liquid crystal display device by a droplet discharge method. A region onto which the spherical spacers are discharged is subjected to liquid-repellent treatment in order to reduce the wettability with respect to the liquids in which the spherical spacers are dispersed. As a result of the liquid-repellent treatment, the liquids (droplets) in which the spherical spacers are dispersed land on a liquid-repellent treatment region while maintaining a large contact angle with respect to the liquid-repellent treatment region. The liquids do not spread over the liquid-repellent region and are dried while moving the spherical spacers toward the center of each of the liquids. Therefore, the spherical spacers can be positioned in the center of each of the liquids, which is the position where the liquids are controlled to be discharged. Thus, incorrect positioning shortly after discharging, which has been caused by the loss of control in the droplets, can be corrected by moving the spherical spacers while drying the droplets.

In this embodiment mode, by using the spherical spacers each attached with an adhesive, in which the adhesive with the substrate is provided on the periphery of each of the spherical spacers, heat treatment can be performed after drying droplets and the spherical spacers can be fixed to the substrate (the conductive layer) with the adhesives.

Since a spherical spacer easily moves, it is often positioned over an insulating layer functioning as an alignment film. However, in the present invention, the insulating layer functioning as an alignment film is formed over a spherical spacer that is positioned over a substrate and fixed thereto, and then subjected to rubbing treatment; thus, the spherical spacer can be positioned in the liquid crystal display device with high positioning accuracy.

The insulating layer functioning as an alignment film can be formed using polyimide, polyamide, or the like. The insulating layer can function as an alignment film by being subjected to rubbing treatment, and a method for forming the insulating layer is not limited. Any of insulating layers may be used as long as they can function as an alignment film for aligning liquid crystal molecules in one direction. Light irradiation or heat treatment may be performed on the insulating layer to form an alignment film.

As the sealant, typically, a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis epoxy resin, a glycidyl ester resin, a glycidyl amine-based resin, a heterocyclic epoxy resin, or a modified epoxy resin can be used.

In the case of using an element substrate that is provided with semiconductor elements such as thin film transistors, the spherical spacers may be positioned (discharged and fixed) over the element substrate, or the spherical spacers may be positioned (discharged and fixed) over a counter substrate provided with a color filter, a black matrix, and the like. Accordingly, the spherical spacers may be positioned (discharged and fixed) either over the substrate 1700 that is an element substrate or over the substrate 1710 that is a counter substrate.

In the case where the liquid crystal layer is formed by a dropping method, liquid crystals may be dropped onto the element substrate provided with elements, or liquid crystals may be dropped onto a sealant that is formed over the counter substrate provided with a color filter, a black matrix, and the like.

As the substrates 1700 and 1710, a glass substrate, a quartz substrate, or the like can be used. Alternatively, a flexible substrate may be used. A flexible substrate is a substrate that can be bent. For example, besides a plastic substrate made from polycarbonate, polyarylate, polyether sulfone, or the like, a high-molecular material elastomer that exhibits characteristics of an elastic body like rubber at room temperature and can be plasticized to be processed like a plastic at high temperature, and the like can be given. Further alternatively, a film (e.g., a film made of polypropylene, polyester, vinyl, polyvinyl fluoride, vinyl chloride, or the like) or an inorganic evaporated film can be used.

Each of the pixel electrode layers 1701*a*, 1701*b* and 1701*c*, and each of the counter electrode layers 1705*a*, 1705*b* and 1705*c* may be formed using any of the following materials: indium tin oxide (ITO), indium zinc oxide (IZO) in which zinc oxide (ZnO) is mixed into indium oxide, a conductive material in which silicon oxide ($SiO_2$) is mixed into indium oxide, organic indium, organotin, indium oxide containing tungsten oxide, indium zinc oxide containing tungsten oxide, indium oxide containing titanium oxide, and indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); and an alloy or nitride of those metals.

In the case of a transmissive liquid crystal display device, a light transmitting conductive material may be used for the pixel electrode layers 1701*a*, 1701*b* and 1701*c* and the counter electrode layers 1705*a*, 1705*b* and 1705*c*. In the case of a reflective liquid crystal display device, a reflective layer may be additionally provided. Alternatively, a reflective conductive material is used for the pixel electrode layers 1701*a*, 1701*b* and 1701*c* and a light transmitting conductive material is used for the counter electrode layers 1705*a*, 1705*b* and 1705*c* so that light reflected by the pixel electrode layers 1701*a*, 1701*b* and 1701*c* passes through the counter electrode layers 1705*a*, 1705*b* and 1705*c* and is emitted from the viewing side.

In the case of a transmissive liquid crystal display device, a backlight, a sidelight, or the like may be used as a light source. In addition, in the case of a transmissive liquid crystal display device, a polarizing plate is also provided on the outer side of the substrate 1700.

The aforementioned electrode layers and insulating layer may be formed by a wet process. In a wet process, a material for forming a thin film is dissolved (dispersed) in a solvent, the resulting liquid composition is deposited on a region where the film is to be formed, and then the solvent (the liquid) is removed to perform solidification, thereby forming a thin film. In this specification, solidification refers to elimination of fluidity to keep a certain shape.

For the wet process, any of the following methods can be employed: a spin coating method, a roll coat method, a spray method, a casting method, a dipping method, a droplet discharge (ejection) method (an inkjet method), a dispenser method, a variety of printing methods (a method by which a thin film can be formed in a desired pattern, such as screen (stencil) printing, offset (planographic) printing, letterpress printing, or gravure (intaglio) printing), and the like. Note that the present invention is not limited to those methods, and any other method using a liquid composition may also be used.

In the wet process, a material is not scattered in a chamber; therefore, and material-use efficiency is higher than in a dry process such as an evaporation method or a sputtering method. Furthermore, since the wet process can be performed under atmospheric pressure, equipment such as a vacuum apparatus can be reduced. In addition, the size of a substrate to be processed is not limited by the size of a vacuum chamber, and it is thus possible to use a larger substrate, whereby low cost and improvement in productivity can be achieved. The wet process only needs heat treatment at a temperature at which a solvent (a liquid) in a composition is removed; thus, the wet process is a so-called low temperature process. Accordingly, it is also possible to use substrates and materials that may degrade or deteriorate by heat treatment at a high temperature.

In addition, since a liquid composition having fluidity is used to form a thin film, materials can be easily mixed and good coverage with respect to a region where a thin film of the composition is formed can also be achieved.

A thin film can be selectively formed by a droplet discharge method in which a composition can be discharged to form a desired pattern, a printing method in which a composition can be transferred or drawn into a desired pattern, and the like. Therefore, less material is wasted and a material can be efficiently used, which results in reduction in production cost. Furthermore, such methods do not require processing of the shape of the thin film by a photolithography process, and therefore simplifies the process and improves the productivity.

Furthermore, after a conductive layer, an insulating layer, or the like is formed by discharging a composition by a droplet discharge method, a surface thereof may be pressed with pressure to increase the planarity. As a pressing method, unevenness may be reduced by moving a roller-shaped object over the surface, or the surface may be pressed with a flat plate-shaped object. A heating step may also be performed at the time of the pressing. Alternatively, the unevenness of the surface may be eliminated with an air knife after softening or melting the surface with a solvent or the like. The surface may also be polished by CMP. This process can be applied for planarizing a surface when unevenness is caused by a droplet discharge method.

In the step of positioning the spherical spacers, the spherical spacers are discharged by a droplet discharge method, and incorrect positioning shortly after discharging of the spherical spacers, which has been caused by the loss of control in the droplets, can be corrected by moving the spherical spacers while drying the droplets.

The spherical spacers can be accurately positioned in a non-display region such as a black matrix (a light shielding film) or a wiring; therefore, it is possible to prevent display defects such as damage due to movement of the spherical spacers in a display region, light leakage, and alignment disorder on the periphery of the spherical spacers. Furthermore, the space between the substrates can be maintained more uniformly than in the case of using a columnar spacer the thickness of which is difficult to be controlled at the time of formation.

As a result, in the liquid crystal display device, the positioning of the spherical spacers can be controlled more accurately, display defects due to incorrect positioning in a display region can be prevented, and the space between the substrates can be maintained uniformly. Furthermore, a liquid crystal display device with superior visibility and higher image quality and reliability can be manufactured with high yield.

This embodiment mode can be combined with Embodiment Mode 1 as appropriate.

Embodiment Mode 3

Described in this embodiment mode is an example of a liquid crystal display device that is improved in image quality and reliability and can be manufactured with high yield. In this embodiment mode, a liquid crystal display device having a different structure from that of Embodiment Mode 2 is described. More specifically, an active matrix liquid crystal display device is described.

Figure 6A:
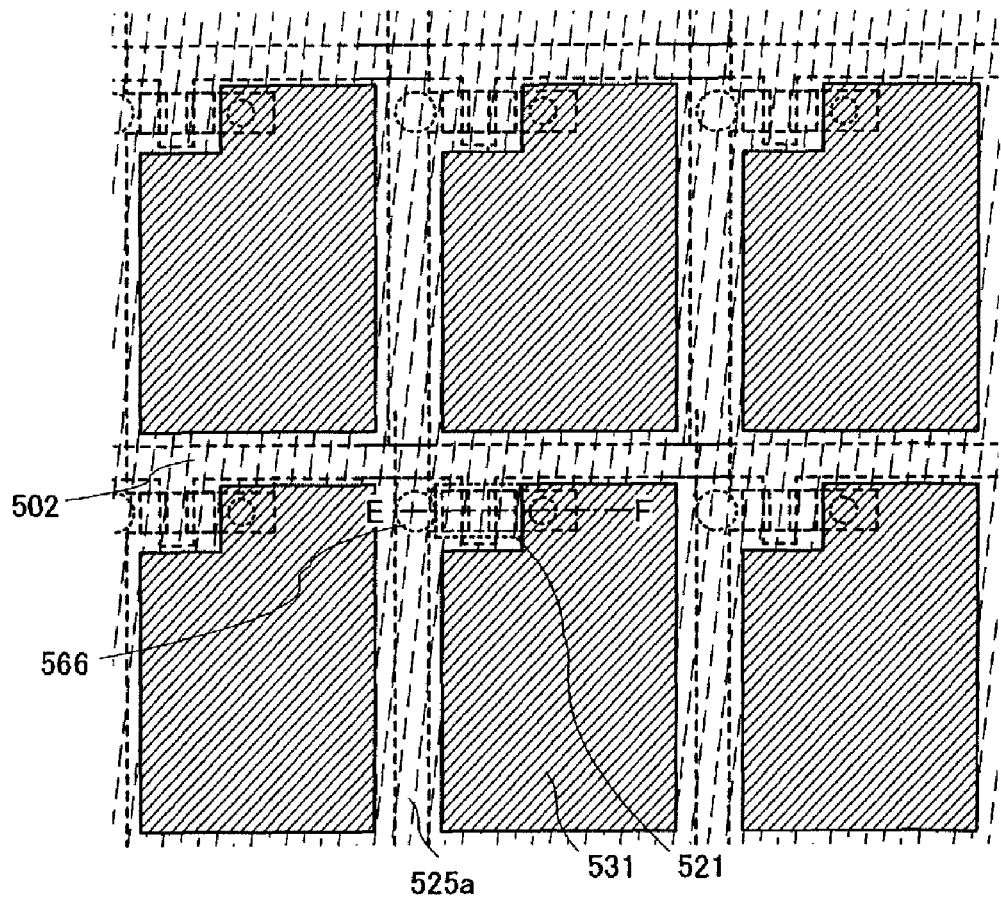
FIGS. 6A and 6B are respectively a top view and a cross-sectional view illustrating a liquid crystal display device according to an aspect of the present invention.
Figure 6B:
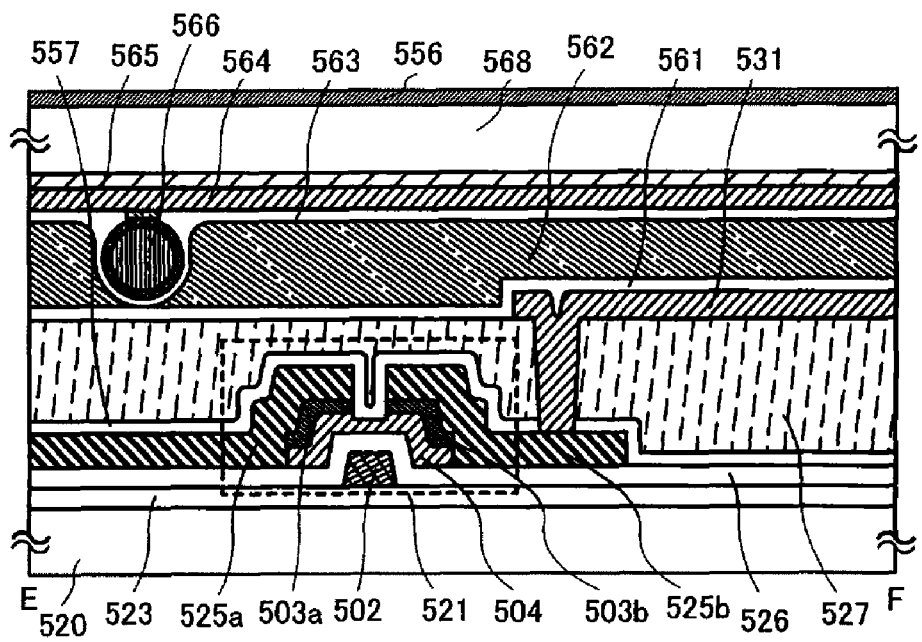

FIG. 6A is a top view of a liquid crystal display device and FIG. 6B is a cross-sectional view along line E-F of FIG. 6A. FIG. 6A includes, as illustrated in FIG. 6B, a liquid crystal layer and an alignment film, a counter electrode layer, a coloring layer, and the like that are provided on a counter substrate side, although they are omitted and not illustrated in FIG. 6A.

A first wiring that extends in a first direction and a second wiring that extends in a second direction perpendicular to the first direction are provided in matrix over a substrate 520 provided with an insulating layer 523 as a base film. The first wiring is connected to a source electrode or a drain electrode of a transistor 521 (functions as the source electrode or the drain electrode of the transistor 521), and the second wiring is connected to a gate electrode of the transistor 521 (functions as the gate electrode of the transistor 521). A pixel electrode layer 531 is connected to a wiring layer 525b that is the source electrode or the drain electrode of the transistor 521, which is not connected to the first wiring.

The substrate 520 is provided with the transistor 521 that is an inverted-staggered thin film transistor, an insulating layer 557, an insulating layer 527, the pixel electrode layer 531, and an insulating layer 561 functioning as an alignment film. A substrate 568 is provided with an insulating layer 563 functioning as an alignment film, a counter electrode layer 564, a coloring layer 565 functioning as a color filter, and a polarizing plate (a layer including a polarizer, also simply referred to as a polarizer) 556. The substrate 520 faces the substrate 568 with a liquid crystal layer 562 interposed therebetween. The counter electrode layer 564 is provided with a spherical spacer 566 attached with an adhesive with an organosilane film interposed therebetween.

Also in the method for manufacturing a liquid crystal display device of this embodiment mode, after the spherical spacer 566 attached with an adhesive is positioned over the counter electrode layer 564 by a droplet discharge method, the insulating layer functioning as an alignment film is formed, rubbing treatment is performed, and then the substrates are attached to each other. In the step of positioning the spherical spacer, first, an organosilane film having a hydrolytic group is formed as liquid-repellent treatment, and a liquid containing a spherical spacer attached with an adhesive is discharged by a droplet discharge method. As the liquid is dried, the spherical spacer moves toward the center of the liquid and the positioning thereof is corrected. Subsequently, the adhesive is heated to fix the spherical spacer, the organosilane film having a hydrolytic group is selectively removed, and lyophilic treatment is performed.

In this embodiment mode, in order to maintain the space between the substrates and control the thickness of the liquid crystal layer, the spherical spacer is positioned in the liquid crystal display device by a droplet discharge method. A region onto which the spherical spacer is discharged is subjected to liquid-repellent treatment in order to reduce the wettability with respect to the liquid in which the spherical spacer is dispersed. As a result of the liquid-repellent treatment, the liquid (the droplet) in which the spherical spacer is dispersed lands on a liquid-repellent treatment region while maintaining a large contact angle with respect to the liquid-repellent treatment region. The liquid does not spread over the liquid-repellent region and is dried while moving the spherical spacer toward the center of the liquid. Therefore, the spherical spacer can be positioned in the center of the liquid, which is the position where the liquid is controlled to be discharged. Thus, incorrect positioning shortly after discharging, which has been caused by the loss of control in the droplet, can be corrected by moving the spherical spacer while drying the droplet.

In this embodiment mode, by using the spherical spacer attached with an adhesive, in which the adhesive with the substrate is provided on the periphery of the spherical spacer, heat treatment can be performed after drying a droplet and the spherical spacer can be fixed to the substrate (the conductive layer) with the adhesive.

Since a spherical spacer easily moves, it is often positioned over an insulating layer functioning as an alignment film. However, in the present invention, an insulating layer functioning as an alignment film is formed over a spherical spacer that is positioned over a substrate and fixed thereto, and then subjected to rubbing treatment; thus, the spherical spacer can be positioned in a liquid crystal display device with high positioning accuracy.

FIGS. 6A and 6B of this embodiment mode illustrate an example in which the transistor 521 is a channel-etched inverted-staggered transistor. In FIGS. 6A and 6B, the transistor 521 includes a gate electrode layer 502, a gate insulating layer 526, a semiconductor layer 504, semiconductor layers 503a and 503b each having one conductivity type, wiring layers 525a and 525b serving as a source electrode layer or a drain electrode layer.

The polarizing plate, the color filter, and the like may be provided between the substrates or outside the substrates. The stacked-layer structure of the polarizing plate and the coloring layer may be set as appropriate depending on the material or manufacturing process conditions of the polarizing plate and the coloring layer. Furthermore, in the case of a reflective liquid crystal display device, one polarizing plate is provided on the counter substrate side that is a viewing side. In the case of a transmissive liquid crystal display device, the element substrate and the counter substrate are each provided with a polarizing plate so that the liquid crystal layer is interposed between the polarizing plates. In addition, a retardation plate or the like may be provided between the polarizing plate and the alignment film, and an optical film such as an anti-reflection film can be provided on the outermost viewing side surface of the liquid crystal display device.

The semiconductor layer can be formed using the following materials: an amorphous semiconductor (hereinafter also referred to as an AS) manufactured by a sputtering method or a vapor-phase growth method using a semiconductor material gas typified by silane or germane; a polycrystalline semiconductor formed by crystallizing the amorphous semiconductor by utilizing light energy or thermal energy; a single crystal semiconductor; and the like.

The amorphous semiconductor is typified by hydrogenated amorphous silicon, and the crystalline semiconductor is typified by polysilicon or the like. Polysilicon (polycrystalline silicon) includes so-called high-temperature polysilicon that contains as its main component polysilicon formed at a process temperature of 800° C. or higher, so-called low-temperature polysilicon that contains as its main component polysilicon formed at a process temperature of 600° C. or lower, and polysilicon formed by crystallizing amorphous silicon by using an element or the like that promotes crystallization. Instead of such a thin film process, an SOI substrate having an insulating surface provided with a single crystal semiconductor layer may be used. The SOI substrate can be formed by a separation by implanted oxygen (SIMOX) method or a Smart-Cut (registered trademark) method. In the SIMOX method, after oxygen ions are implanted into a single crystal silicon substrate to form an oxygen-containing layer at a predetermined depth, heat treatment is performed, an embedded insulating layer is formed at a predetermined depth from the surface of the single crystal silicon substrate, and a single crystal silicon layer is formed over the embedded insulating layer. In the Smart-Cut method, hydrogen ions are implanted into an oxidized single crystal silicon substrate to form a hydrogen-containing layer at a predetermined depth, the oxidized single crystalline silicon substrate is attached to another supporting substrate (e.g., a single crystal silicon substrate having a surface provided with a silicon oxide film for bonding), and heat treatment is performed, whereby the single crystal silicon substrate is separated at the hydrogen-containing layer to form stacked layers of the silicon oxide film and the single crystal silicon layer over the supporting substrate.

In the case where a crystalline semiconductor film is used as the semiconductor film, the crystalline semiconductor film may be manufactured by using various methods (e.g., a laser crystallization method, a thermal crystallization method, or a thermal crystallization method using an element such as nickel that promotes crystallization). A microcrystalline semiconductor may be crystallized by laser irradiation to improve crystallinity. In the case where the element that promotes crystallization is not introduced, before an amorphous semiconductor layer is irradiated with laser light, the amorphous semiconductor layer is heated at a temperature of 500° C. for one hour in a nitrogen atmosphere, whereby hydrogen contained in the amorphous semiconductor layer is released to a concentration of $1 \times 10^{20}$ atoms/cm$^3$ or less. This is because the amorphous semiconductor layer containing much hydrogen is damaged by laser light irradiation. Heat treatment for crystallization can be performed using a heating furnace, laser irradiation, irradiation with light emitted from a lamp (also referred to as lamp annealing), or the like. An example of a heating method is RTA such as gas rapid thermal annealing (GRTA) or lamp rapid thermal annealing (LRTA). GRTA is a method for performing heat treatment using a high-temperature gas, and LRTA is a method for performing heat treatment by using lamp light.

In a crystallization step in which an amorphous semiconductor layer is crystallized to form a crystalline semiconductor layer, crystallization may be performed by adding an element that promotes crystallization (also referred to as a catalyst element or a metal element) to an amorphous semiconductor layer and performing heat treatment (at 550° C. to 750° C. for 3 minutes to 24 hours). As the element that promotes crystallization, one or more kinds of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

Any method can be used to introduce a metal element into the amorphous semiconductor layer as long as the method is capable of making the metal element exist on the surface or inside of the amorphous semiconductor layer. For example, it is possible to use a sputtering method, a CVD method, a plasma treatment method (including a plasma CVD method), an adsorption method, or a method of applying a metal salt solution. Among them, the method using a solution is simple and easy, and advantageous in that the concentration of the metal element is easily controlled. In that case, an oxide film is preferably deposited by irradiation with UV light in an oxygen atmosphere, a thermal oxidation method, treatment with ozone water or hydrogen peroxide including a hydroxyl radical, or the like in order to improve the wettability of the surface of the amorphous semiconductor layer to spread an aqueous solution over the entire surface of the amorphous semiconductor layer.

In order to remove the element that promotes crystallization from the crystalline semiconductor layer or reduce the element, a semiconductor layer containing an impurity element is formed in contact with the crystalline semiconductor layer, which functions as a gettering sink. The impurity element may be an impurity element imparting n-type conductivity, an impurity element imparting p-type conductivity, a noble gas element, or the like. For example, it is possible to use one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe). A semiconductor layer containing a noble gas element is formed over the crystalline semiconductor layer containing the element that promotes crystallization, and heat treatment (at 550° C. to 750° C. for 3 minutes to 24 hours) is performed. The element that promotes crystallization in the crystalline semiconductor layer moves into the semiconductor layer containing a noble gas element, whereby the element that promotes crystallization in the crystalline semiconductor layer is removed or reduced. After that, the semiconductor layer containing a noble gas element, which serves as a gettering sink, is removed.

Laser irradiation can be performed by relatively scanning a laser beam and the semiconductor layer. In laser irradiation, markers can be formed in order to overlap beams with high accuracy or to control a start position or an end position of laser irradiation. The markers may be formed over the substrate at the same time as the formation of the amorphous semiconductor layer.

In the case of using laser irradiation, a continuous-wave laser beam (CW laser beam) or a pulsed laser beam can be used. An applicable laser beam is a beam emitted from one or more kinds of the following lasers: a gas laser such as an Ar laser, a Kr laser, or an excimer laser; a laser using, as a medium, single crystal YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta is added as a dopant; a glass laser; a ruby laser; an alexandrite laser; a Ti:sapphire laser; a copper vapor laser; and a gold vapor laser. A crystal having a large grain diameter can be obtained by irradiation with the fundamental wave of any of the above laser beams or the second harmonic to the fourth harmonic of the fundamental wave thereof. For example, the second harmonic (532 nm) or the third harmonic (355 nm) of an Nd:$YVO_4$ laser (the fundamental wave: 1064 nm) can be used. This laser can emit either a CW laser beam or a pulsed laser beam. When the laser emits a CW laser beam, a power density of the laser needs to be about 0.01 $MW/cm^2$ to 100 $MW/cm^2$ (preferably, 0.1 $MW/cm^2$ to 10 $MW/cm^2$). A scanning rate for irradiation is about 10 cm/sec to 2000 cm/sec.

Note that the laser using, as a medium, single crystal YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta is added as a dopant; an Ar ion laser; or a Ti:sapphire laser can be used as a CW laser, and they can also be used as a pulsed laser with a repetition rate of 10 MHz or more by being combined with Q-switch operation, mode locking, or the like. When a laser beam is oscillated at a repetition rate of 10 MHz or more, the semiconductor film is irradiated with a pulsed laser beam after being melted by a preceding laser beam and before being solidified. Therefore, unlike the case of using a pulsed laser with a low repetition rate, a solid-liquid interface can be moved continuously in the semiconductor film, so that crystal grains grown continuously in the scanning direction can be obtained.

When ceramic (polycrystal) is used as a medium, the medium can be formed into a desired shape in a short time at low cost. In the case of using a single crystal, a columnar medium having a diameter of several millimeters and a length of several tens of millimeters is generally used. In the case of using ceramic, a larger medium can be formed.

The concentration of a dopant such as Nd or Yb in a medium, which directly contributes to light emission, cannot be changed largely either in a single crystal or in a polycrystal. Therefore, there is a limitation on improvement in laser output by increasing the concentration. However, in the case of using ceramic, the size of a medium can be significantly increased compared with the case of using a single crystal, and thus, significant improvement in output can be achieved.

Furthermore, in the case of using ceramic, a medium having a parallelepiped shape or a rectangular solid shape can be easily formed. When a medium having such a shape is used and emitted light propagates inside the medium in zigzag, the light path can be extended. Therefore, the light is amplified largely and can be emitted with high output. In addition, since a laser beam emitted from a medium having such a shape has a quadrangular shape in cross-section at the time of emission, it has an advantage over a circular beam in being shaped into a linear beam. By shaping the thus emitted laser beam using an optical system, a linear beam having a length of 1 mm or less on a shorter side and a length of several millimeters to several meters on a longer side can be easily obtained. Furthermore, by uniformly irradiating the medium with excited light, the linear beam has a uniform energy distribution in a long-side direction. Moreover, the semiconductor film is preferably irradiated with the laser beam at an incident angle θ (0°<θ<90°) to prevent laser interference.

By irradiating the semiconductor film with this linear beam, the entire surface of the semiconductor film can be annealed more uniformly. When uniform annealing of the linear beam is required, it is necessary to exercise ingenuity such as providing slits so as to block light at a portion where energy is attenuated.

When the thus obtained linear beam with uniform intensity is used for annealing the semiconductor film and a liquid crystal display device is manufactured using this semiconductor film, the liquid crystal display device has favorable and uniform characteristics.

The laser light irradiation may be performed in an inert gas atmosphere such as a noble gas or nitrogen. This can suppress surface roughness of the semiconductor film and can also suppress variation in threshold value, which is caused by variation in interface state density.

In order to crystallize the amorphous semiconductor film, heat treatment and laser light irradiation may be performed in combination, or either heat treatment or laser light irradiation may be performed several times.

The gate electrode layer can be formed by a sputtering method, an evaporation method, a CVD method, or the like. The gate electrode layer may be formed using an element selected from tantalum (Ta), tungsten (W), titanium (Ti), molybdenum (Mo), aluminum (Al), copper (Cu), chromium (Cr), and neodymium (Nd), or an alloy or compound material containing any of those elements as its main component. Alternatively, the gate electrode layer may be formed using an AgPdCu alloy or a semiconductor film typified by a polycrystalline silicon film doped with an impurity element such as phosphorus. The gate electrode layer may be a single layer or stacked layers.

Although the gate electrode layer is formed in a tapered shape in this embodiment mode, the present invention is not limited thereto. The gate electrode layer may have a stacked-layer structure, in which only one layer may have a tapered shape and the other(s) may have a perpendicular side surface that is formed by anisotropic etching. The layers included in the gate electrode layer may have different taper angles or the same taper angle. When the gate electrode layer has a tapered shape, the coverage thereof with a film to be stacked thereover is improved and defects can be reduced, which results in improvement in reliability.

The source electrode layer or the drain electrode layer can be formed in such a manner that a conductive film is deposited by a sputtering method, a PVD method, a CVD method, an evaporation method, or the like and then etched into a desired shape. Alternatively, a conductive layer can be selectively formed in a predetermined position by a droplet discharge method, a printing method, a dispenser method, an electroplating method, or the like. Still alternatively, a reflow method or a damascene method may be used. A material of the source electrode layer or the drain electrode layer can be a conductive material such as metal, specifically, Ag, Au, Cu, Ni, Pt, Pd, Ir, Rh, W, Al, Ta, Mo, Cd, Zn, Fe, Ti, Zr, Ba, Si, or Ge or an alloy or a nitride of any of those elements. A stacked-layer structure thereof may also be used.

The insulating layers 523, 557 and 527 may be formed using an inorganic insulating material such as silicon oxide, silicon nitride, silicon oxynitride, aluminum oxide, aluminum nitride, or aluminum oxynitride; an acrylic acid, a methacrylic acid, or a derivative thereof; a heat resistant high molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or an urethane resin may be used. Further alternatively, an organic material such as benzocyclobutene, fluorinated arylene ether, or polyimide, a composition material containing a water-soluble homopolymer and a water-soluble copolymer, or the like may be used. The insulating layers 523, 557 and 527 can be formed by a vapor-phase growth method such as a plasma CVD method or a thermal CVD method, or a sputtering method. Alternatively, they can be formed by a droplet discharge method or a printing method (a screen printing or offset printing by which a pattern is formed). A film obtained by a coating method, an SOG film, or the like can also be used.

The structure of the thin film transistor is not limited to that described in this embodiment mode, and the thin film transistor may have a single gate structure including a single channel formation region, a double gate structure including two channel formation regions, or a triple gate structure including three channel formation regions. Furthermore, a thin film transistor in a peripheral driver circuit region may also have a single gate structure, a double gate structure, or a triple gate structure.

Note that without limitation to the method for manufacturing a thin film transistor that is described in this embodiment mode, the present invention can be applied to a top gate structure (e.g., a staggered structure or a coplanar structure), a bottom gate structure (e.g., an inverted coplanar structure), a dual gate structure including two gate electrode layers provided over and under a channel region each with a gate insulating film interposed therebetween, or other structures.

The transistor may have any structure as long as it can serve as a switching element. The semiconductor layer may be formed using various semiconductors such as an amorphous semiconductor, a crystalline semiconductor, a polycrystalline semiconductor, and a microcrystalline semiconductor. An organic transistor may be formed using an organic compound.

In the step of positioning a spherical spacer, the spherical spacer is discharged by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

This embodiment mode can be combined with Embodiment Mode 1 as appropriate. As the materials and manufacturing method of the electrode layers, the insulating layers, and the like included in the liquid crystal display device, the description of Embodiment Mode 2 can be referred to and applied as appropriate.

Embodiment Mode 4

Described in this embodiment mode is an example of a liquid crystal display device that is improved in image quality and reliability and can be manufactured with high yield. More specifically, description is made on a liquid crystal display device of the present invention, which uses a thin film transistor having a crystalline semiconductor film.

Figure 11A:
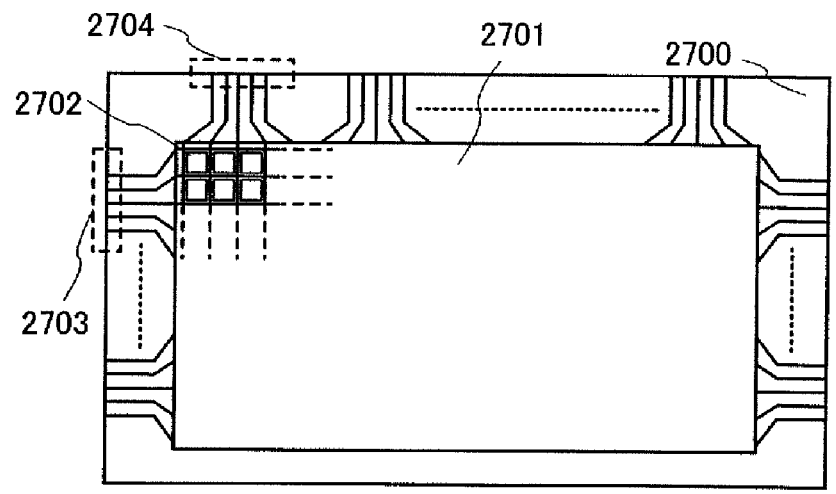
FIGS. 11A to 11C are top views each illustrating a liquid crystal display device according to an aspect of the present invention.

FIG. 11A is a top view illustrating a structure of a display panel using the present invention. A pixel portion 2701 including pixels 2702 arranged in matrix, a scanning line side input terminal 2703, and a signal line side input terminal 2704 are formed over a substrate 2700 having an insulating surface. The number of pixels may be determined in accordance with various standards. In the case of XGA and full color display using RGB, the number of pixels may be 1024×768×3 (RGB). In the case of UXGA and full color display using RGB, the number of pixels may be 1600×1200×3 (RGB). In the case of full-spec high-definition display using RGB, the number of pixels may be 1920×1080×3 (RGB).

The pixels 2702 are arranged in matrix by being provided at intersections of scanning lines extending from the scanning line input terminal 2703 and signal lines extending from the signal line input terminal 2704. Each pixel in the pixel portion 2701 includes a switching element and a pixel electrode layer connected thereto. A typical example of the switching element is a TFT. A gate electrode layer side of the TFT is connected to the scanning line, and a source or drain side thereof is connected to the signal line, whereby each pixel can be controlled independently by a signal inputted from an external portion.

Figure 12A:
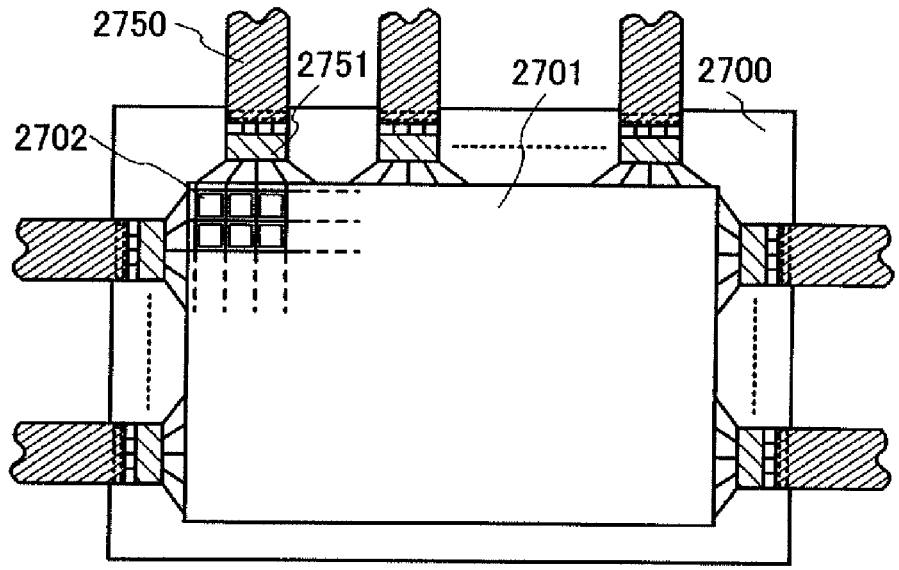
FIGS. 12A and 12B are top views each illustrating a liquid crystal display device according to an aspect of the present invention.
Figure 12B:
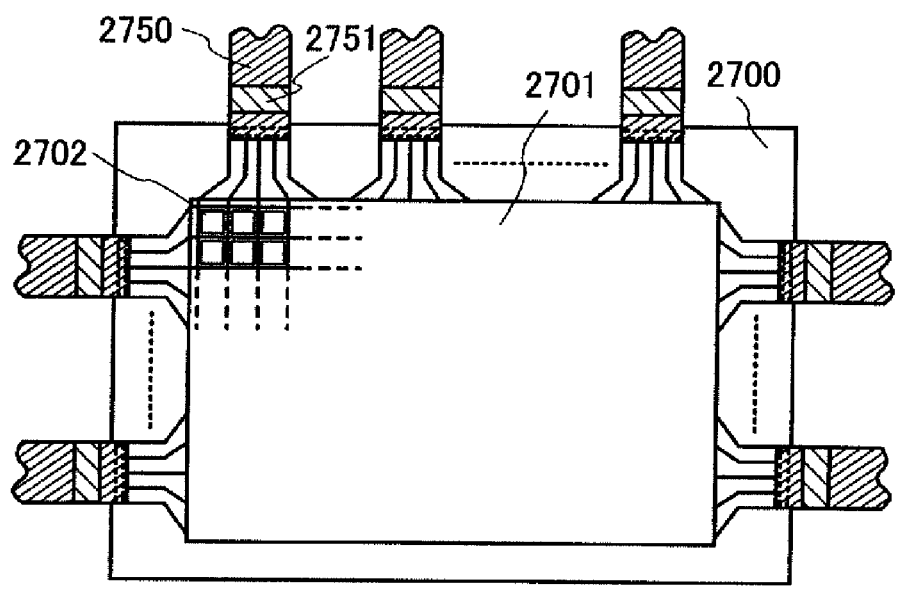

Although FIG. 11A illustrates a structure of a display panel in which signals inputted to the scanning line and the signal line are controlled by an external driver circuit, a driver IC 2751 may be mounted on the substrate 2700 by chip on glass (COG), as illustrated in FIG. 12A. Alternatively, tape automated bonding (TAB) as illustrated in FIG. 12B may be employed. The driver IC may be formed over a single crystal semiconductor substrate or may be a circuit that is formed using a TFT over a glass substrate. In FIGS. 12A and 12B, the driver IC 2751 is connected to a flexible printed circuit (FPC) 2750.

Figure 11B:
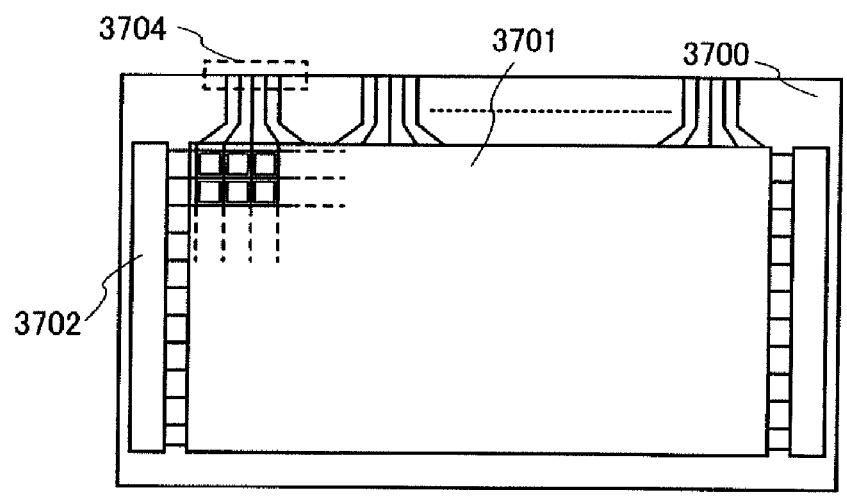
Figure 11C:
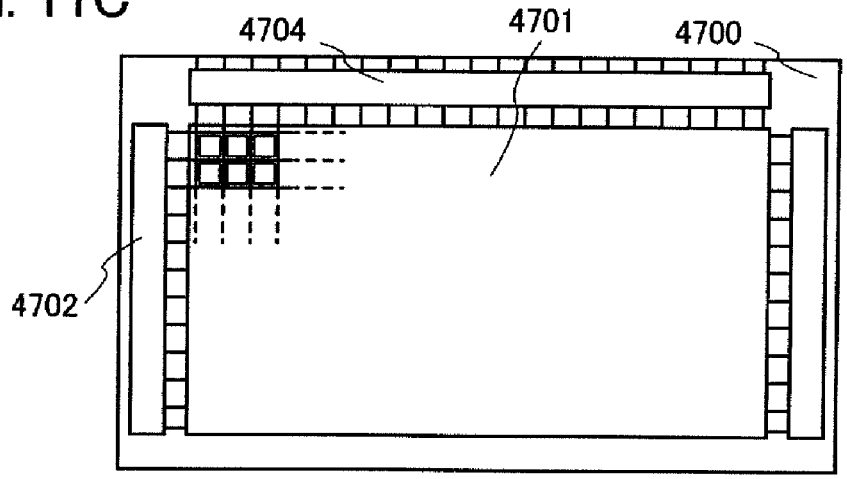

In the case where a TFT included in a pixel is formed using a crystalline semiconductor, a scanning line driver circuit 3702 can also be formed over a substrate 3700, as illustrated in FIG. 11B. In FIG. 11B, a pixel portion 3701 is controlled by an external driver circuit connected to a signal line side input terminal 3704, similarly to FIG. 11A. In the case where the TFT included in the pixel is formed using a polycrystalline (microcrystalline) semiconductor, a single crystal semiconductor, or the like with high mobility, a pixel portion 4701, a scanning line driver circuit 4702, and a signal line driver circuit 4704 can all be formed over a substrate 4700, as illustrated in FIG. 11C.

Figure 7A:
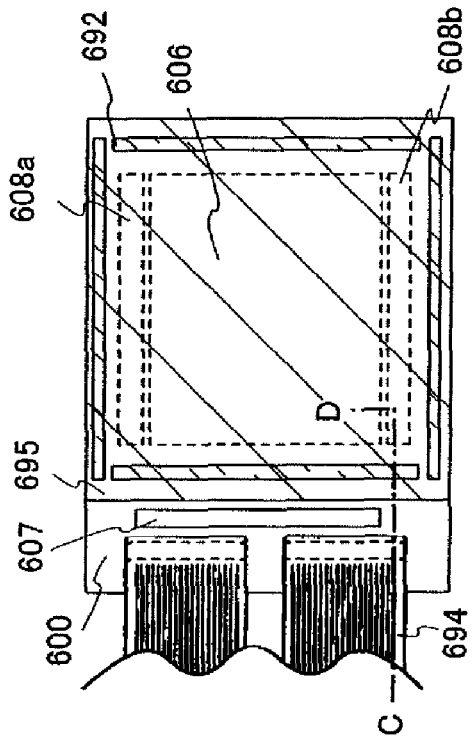
FIGS. 7A and 7B are respectively a top view and a cross-sectional view illustrating a liquid crystal display device according to an aspect of the present invention.
Figure 7B:
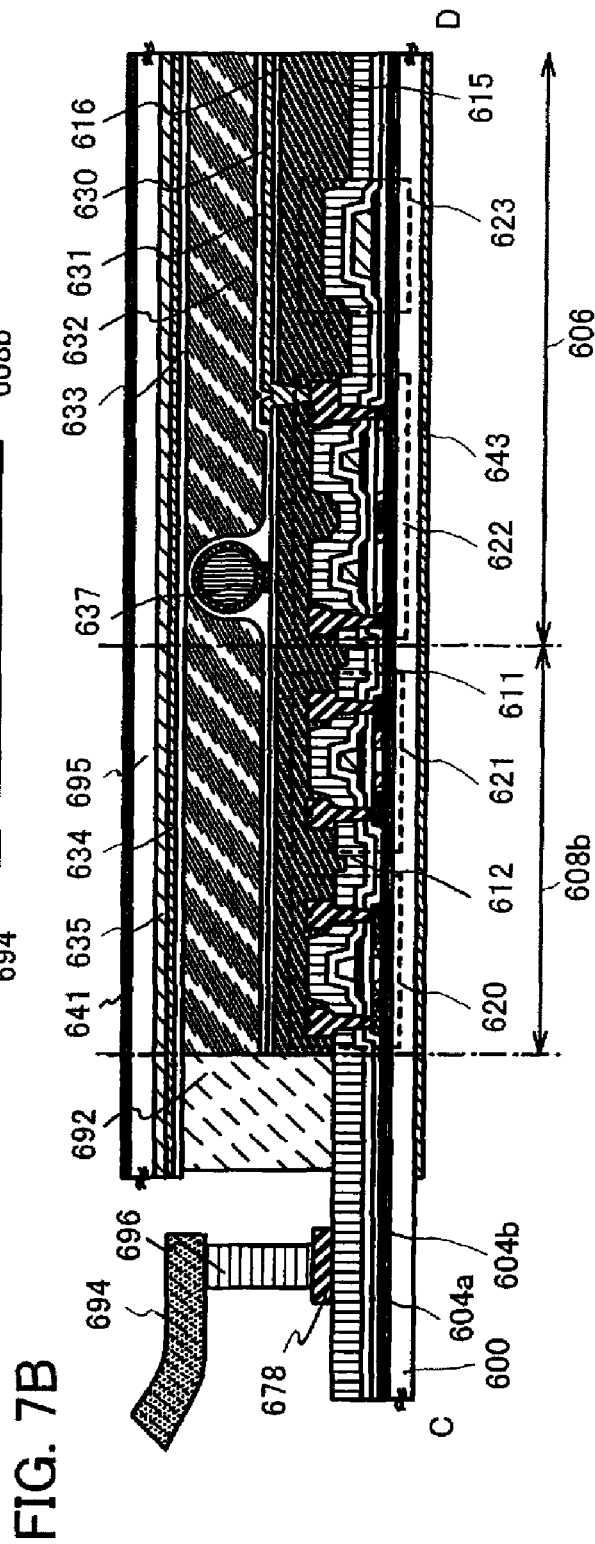

FIG. 7A is a top view of the liquid crystal display device of this embodiment mode using the present invention and FIG. 7B is a cross-sectional view taken along line C-D of FIG. 7A.

As illustrated in FIGS. 7A and 7B, a pixel region 606, a driver circuit region 608a that is a scanning line driver circuit, and a driver circuit region 608b that is a scanning line driver region are sealed between a substrate 600 that is an element substrate and a substrate 695 that is a counter substrate with a sealant 692. A driver circuit region 607 that is a signal line driver circuit formed using a driver IC is provided over the substrate 600. In the pixel region 606, a transistor 622 and a capacitor 623 are provided, and in the driver circuit region 608b, a driver circuit including a transistor 620 and a transistor 621 is provided.

The substrate 600 and the substrate 695 are insulating substrates with a light transmitting property (hereinafter also referred to as a light transmitting substrate). The substrate particularly transmits light in a wavelength region of visible light. For example, a glass substrate such as a barium borosilicate glass or aluminoborosilicate glass, or a quartz substrate can be used. Alternatively, a substrate formed from plastics typified by polyethylene terephthalate (PET), polyethylene naphthalate (PEN), polyethersulfone (PES), and polycarbonate (PC); or a substrate formed from a flexible synthetic resin such as acrylic can be employed. Further alternatively, a film (formed from polypropylene, polyester, vinyl, polyvinyl fluoride, vinyl chloride, or the like), a base film (formed from polyester, polyamide, an inorganic evaporated film, or the like), and the like may be used. Although there is a concern that a substrate formed from a synthetic resin generally has a low heat-resistance temperature compared to other kinds of substrates, the substrate formed from a synthetic resin can be used when an element is manufactured using a substrate with high heat resistance and then the element is transferred to a substrate formed from a synthetic resin.

In the pixel region 606, the transistor 622 serving as a switching element is provided over the substrate 600 with a base film 604a and a base film 604b interposed therebetween.

A material for the base films 604a and 604b may be an acrylic acid, a methacrylic acid, or a derivative thereof; a heat resistant high molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or an urethane resin may be used. Further alternatively, an organic material such as benzocyclobutene, parylene, fluorinated arylene ether, or polyimide, a composition material containing a water-soluble homopolymer and a water-soluble copolymer, or the like may be used. Still further, an oxazole resin, for example, a photo-curable polybenzoxazole or the like can also be used.

The base films 604a and 604b can be formed by a sputtering method, a physical vapor deposition (PVD) method, a chemical vapor deposition (CVD) method such as a low-pressure CVD (LPCVD) method or a plasma CVD method, or the like. Alternatively, the base films 604a and 604b can be formed by a droplet discharge method, a printing method (e.g., screen printing or offset printing by which a pattern is formed), a coating method such as a spin coating method, a dipping method, a dispenser method, or the like.

In this embodiment mode, the transistor 622 is a multigate thin film transistor (TFT), which includes a semiconductor layer including impurity regions functioning as a source region and a drain region, a gate insulating layer, a gate electrode layer having a two stacked layers, and a source electrode layer and a drain electrode layer. The source electrode layer or the drain electrode layer is in contact with and is electrically connected to the impurity region in the semiconductor layer and a pixel electrode layer 630. A thin film transistor can be manufactured by various methods. For example, a crystalline semiconductor film is used as an active layer, a gate electrode is formed over the crystalline semiconductor film with a gate insulating film interposed therebetween, and an impurity element is added to the active layer using the gate electrode. When an impurity element is added using the gate electrode, a mask does not need to be formed for addition of the impurity element. The gate electrode can have a single-layer structure or a stacked-layer structure. The impurity region can be formed as a high concentration impurity region or a low concentration impurity region by controlling the concentration thereof. A structure of such a thin film transistor having a low concentration impurity region is referred to as a lightly doped drain (LDD) structure. The low concentration impurity region can overlap with the gate electrode, and a structure of such a thin film transistor is referred to as a gate overlapped LDD (GOLD) structure. An n-type thin film transistor can be formed by using phosphorus (P) in the impurity region. In the case of forming a p-type thin film transistor, boron (B) or the like may be added. After that, an insulating film 611 and an insulating film 612 are formed to cover the gate electrode and the like. Dangling bonds of the crystalline semiconductor film can be terminated by a hydrogen element mixed into the insulating film 611 (and the insulating film 612).

In order to further improve planarity, an insulating film 615 and an insulating film 616 may be formed as interlayer insulating films. The insulating films 615 and 616 can be formed using an organic material, an inorganic material, or stacked layers thereof. For example, the insulating films 615 and 616 can be formed using a material selected from substances containing an inorganic insulating material such as silicon oxide, silicon nitride, silicon oxynitride, silicon nitride oxide, aluminum nitride, aluminum oxynitride, aluminum nitride oxide having a higher content of nitrogen than that of oxygen, aluminum oxide, diamond-like carbon (DLC), polysilazane, nitrogen-containing carbon (CN), phosphosilicate glass (PSG), borophosphosilicate glass (BPSG), or alumina. Alternatively, an organic insulating material may also be used. As the organic material, a photosensitive or non-photosensitive organic insulating material, such as polyimide, acrylic, polyamide, polyimide amide, a resist, benzocyclobutene, or a siloxane resin can be used. Note that a siloxane resin corresponds to a resin having Si—O—Si bonds. Siloxane has a skeleton structure formed by the bond of silicon (Si) and oxygen (O). As a substituent, an organic group containing at least hydrogen (for example, an alkyl group or an aryl group) is used. A fluoro group may be included in the organic group.

By using a crystalline semiconductor film, the pixel region and the driver circuit region can be formed over the same substrate. In that case, the transistor in the pixel region and the transistor in the driver circuit region 608*b* are formed at the same time. The transistor used in the driver circuit region 608*b* constitutes a part of a CMOS circuit. Although the thin film transistor included in the CMOS circuit has a GOLD structure in this embodiment mode, it may have an LDD structure like the transistor 622.

The structure of the thin film transistor is not limited to that described in this embodiment mode, and the thin film transistor may have a single gate structure including a single channel formation region, a double gate structure including two channel formation regions, or a triple gate structure including three channel formation regions. Furthermore, a thin film transistor in a peripheral driver circuit region may also have a single gate structure, a double gate structure, or a triple gate structure.

Note that without limitation to the method for manufacturing a thin film transistor that is described in this embodiment mode, the present invention can be applied to a top gate structure (e.g., a staggered structure), a bottom gate structure (e.g., an inverted-staggered transistor), a dual gate structure including two gate electrode layers provided over and under a channel region each with a gate insulating film interposed therebetween, or other structures.

In this embodiment mode, a spherical spacer 637 attached with an adhesive is positioned over the insulating film 616 with an organosilane film interposed therebetween.

Also in the method for manufacturing a liquid crystal display device of this embodiment mode, after the spherical spacer 637 attached with an adhesive is positioned over the insulating film 616 by a droplet discharge method, an insulating layer 631 functioning as an alignment film is formed, rubbing treatment is performed, and then the substrates are attached to each other. In the step of positioning the spherical spacer, first, an organosilane film having a hydrolytic group is formed as liquid-repellent treatment, and a liquid containing a spherical spacer attached with an adhesive is discharged by a droplet discharge method. As the liquid is dried, the spherical spacer moves toward the center of the liquid and the positioning thereof is corrected. Subsequently, the adhesive is heated to fix the spherical spacer, the organosilane film having a hydrolytic group is selectively removed, and lyophilic treatment is performed.

In this embodiment mode, in order to maintain the space between the substrates and control the thickness of the liquid crystal layer, the spherical spacer is positioned in the liquid crystal display device by a droplet discharge method. A region onto which the spherical spacer is discharged is subjected to liquid-repellent treatment in order to reduce the wettability with respect to the liquid in which the spherical spacer is dispersed. As a result of the liquid-repellent treatment, the liquid (the droplet) in which the spherical spacer is dispersed lands on a liquid-repellent treatment region while maintaining a large contact angle with respect to the liquid-repellent treatment region. The liquid does not spread over the liquid-repellent region and is dried while moving the spherical spacer toward the center of the liquid. Therefore, the spherical spacer can be positioned in the center of the liquid, which is the position where the liquid is controlled to be discharged. Thus, incorrect positioning shortly after discharging, which has been caused by the loss of control in the droplet, can be corrected by moving the spherical spacer while drying the droplet.

In this embodiment mode, by using the spherical spacer attached with an adhesive, in which the adhesive with the substrate is provided on the periphery of the spherical spacer, heat treatment can be performed after drying a droplet and the spherical spacer can be fixed to the substrate (the conductive layer) with the adhesive.

Since a spherical spacer easily moves, it is often positioned over an insulating layer functioning as an alignment film. However, in the present invention, an insulating layer functioning as an alignment film is formed over a spherical spacer that is positioned over a substrate and fixed thereto, and then subjected to rubbing treatment; thus, the spherical spacer can be positioned in a liquid crystal display device with high positioning accuracy.

Next, the insulating layer 631 functioning as an alignment film is formed by a printing method or a droplet discharge method to cover the pixel electrode layer 630, the insulating film 616, and the spherical spacer 637. Note that the insulating layer 631 can be selectively formed using a screen printing method or an offset printing method. After that, rubbing treatment is performed. An insulating layer 633 functioning as an alignment film is formed similarly to the insulating layer 631. Then, the sealant 692 is formed by a droplet discharge method in a peripheral region of the pixel region.

The liquid crystal layer may be formed by a dropping method or an injecting method. Liquid crystals may be dropped onto the substrate 600 that is an element substrate, or liquid crystals may be dropped onto the sealant 692 formed over the substrate 695 that is a counter substrate provided with a coloring layer 635 functioning as a color filter.

As the sealant 692, typically, a visible light curable resin, an ultraviolet curable resin, or a thermosetting resin is preferably used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis epoxy resin, a glycidyl ester resin, a glycidyl amine-based resin, a heterocyclic epoxy resin, or a modified epoxy resin can be used.

Then, a polarizing plate 641 is provided on the outer side of the substrate 695 that is a counter substrate, and a polarizing plate 643 is provided on a side of the substrate 600, which is opposite to the side including the elements. The polarizing plate can be attached to the substrate with use of an adhesive layer. A retardation plate may be provided between the polarizing plate and the substrate. A filler may be mixed into the sealant, and a shielding film (black matrix) or the like may be formed over the substrate 695 that is a counter substrate. Note that a color filter or the like may be formed of materials that exhibit red (R), green (G), and blue (B) in the case where the liquid crystal display device is a full-color display; and the coloring layer may be omitted or may be formed of a material that exhibits at least one color in the case where the liquid crystal display device is a single-color display.

Note that the color filter is not always provided in the case where light emitting diodes (LEDs) of RGB or the like are arranged in a backlight unit and a successive additive color mixing method (field sequential method) in which color display is performed by time division is employed. The black matrix is preferably provided so as to overlap with a transistor and a CMOS circuit for the sake of reducing reflection of external light by wirings of the transistor and the CMOS circuit. Note that the black matrix may be provided so as to overlap with a capacitor. This is because reflection by a metal film included in the capacitor can be prevented.

Then, a terminal electrode layer 678 electrically connected to the pixel region is attached to an FPC 694 that is a wiring board for connection, through an anisotropic conductive layer 696. The FPC 694 transmits external signals or potentials. Through the aforementioned steps, a liquid crystal display device having a display function can be manufactured.

A wiring and a gate electrode layer that are included in a transistor, the pixel electrode layer 630, and the counter electrode layer 634 are formed using one or a plurality of the followings; indium tin oxide (ITO), indium zinc oxide (IZO) in which zinc oxide (ZnO) is mixed into indium oxide, a conductive material in which silicon oxide ($SiO_2$) is mixed into indium oxide, organic indium, organotin, indium oxide containing tungsten oxide, indium zinc oxide containing tungsten oxide, indium oxide containing titanium oxide, and indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); and an alloy or nitride of any of those metals.

In the case of a transmissive liquid crystal display device, a light transmitting conductive material may be used for the pixel electrode layer 630 and the counter electrode layer 634. In the case of a reflective liquid crystal display device, a reflective layer may be additionally provided. Alternatively, a reflective conductive material is used for the pixel electrode layer 630 and a light transmitting conductive material is used for the counter electrode layer 634 so that light reflected by the pixel electrode layer 630 passes through the counter electrode layer 634 and is emitted from the viewing side.

The source electrode layer or the drain electrode layer is not necessarily directly connected to the pixel electrode layer, and may be connected to the pixel electrode layer through a wiring layer so as to be electrically connected. Alternatively, the pixel electrode layer is partially stacked over the source electrode layer or the drain electrode layer. Further alternatively, the pixel electrode layer may be formed first and then the source electrode layer or the drain electrode layer may be formed thereover to be in contact with the pixel electrode layer.

Although the aforementioned circuits are used in this embodiment mode, the present invention is not limited thereto and an IC chip may be mounted as a peripheral driver circuit by the aforementioned COG or TAB. Furthermore, the number of gate line driver circuits and source line driver circuits is not especially limited.

In the liquid crystal display device of the present invention, a driving method for displaying images is not particularly limited, and for example, a dot sequential driving method, a line sequential driving method, an area sequential driving method, or the like may be used. Typically, the line sequential driving method is used, and a time division gray scale driving method or an area gray scale driving method may be used as appropriate. Furthermore, an image signal inputted to the source line of the liquid crystal display device may be either an analog signal or a digital signal. The driver circuit and the like may be designed as appropriate depending on the image signal.

In the step of positioning a spherical spacer, the spherical spacer is discharged by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

This embodiment mode can be combined with Embodiment Mode 1 as appropriate. As the materials and manufacturing method of the electrode layers, the insulating layers, and the like included in the liquid crystal display device, the description of Embodiment Mode 2 can be referred to and applied as appropriate.

Embodiment Mode 5

Described in this embodiment mode is an example of a liquid crystal display device that is improved in image quality and reliability and can be manufactured with high yield. More specifically, description is made on a liquid crystal display device of the present invention, which uses a thin film transistor having an amorphous semiconductor film.

Figure 8:
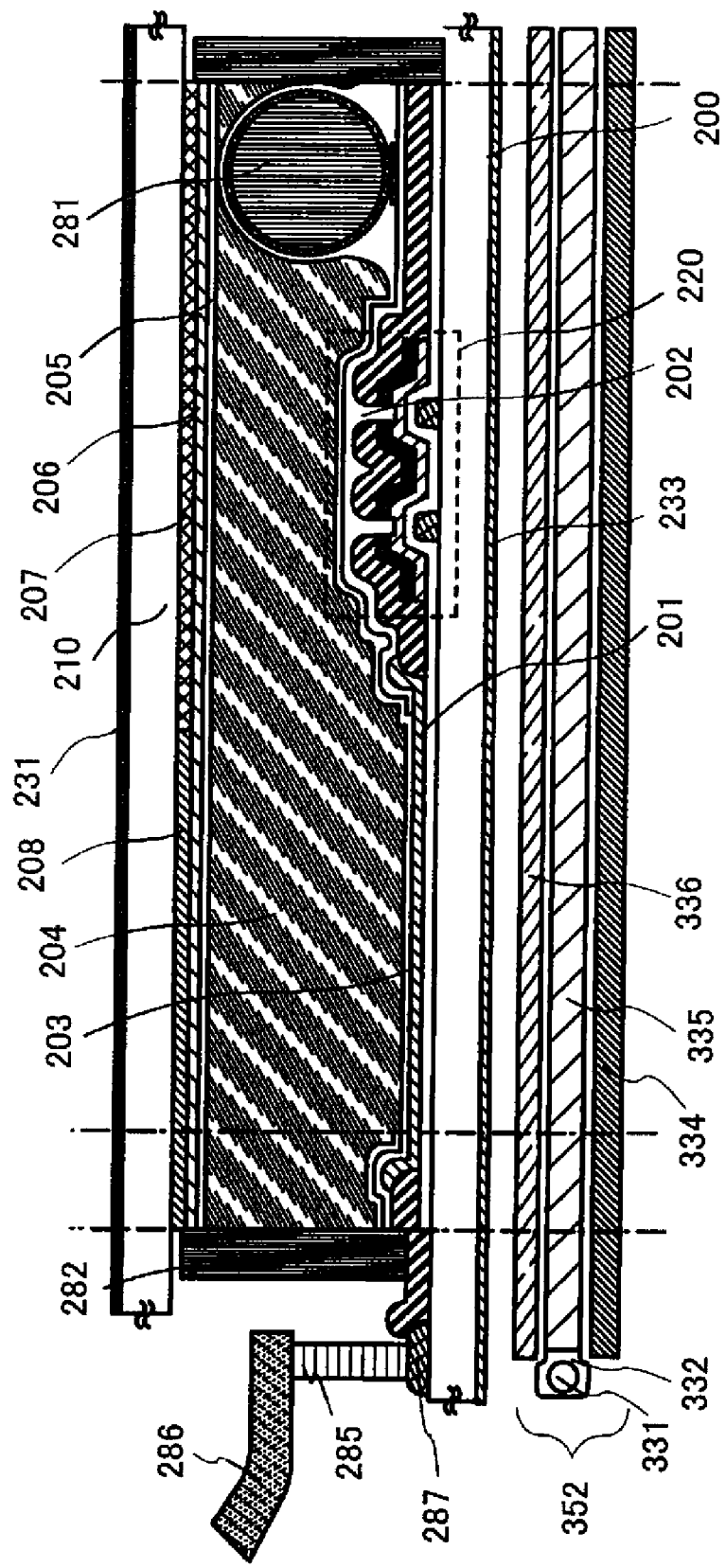
FIG. 8 is a cross-sectional view illustrating a liquid crystal display device according to an aspect of the present invention.

In a liquid crystal display device illustrated in FIG. 8, a pixel region and a sealing region are provided over a substrate 200 that is an element substrate. The pixel region includes a transistor 220 that is an inverted-staggered thin film transistor, a pixel electrode layer 201, an insulating film 202, an insulating layer 203 functioning as an alignment film, a liquid crystal layer 204, a spherical spacer 281, an insulating layer 205 functioning as an alignment film, a counter electrode layer 206, a color filter 208, a black matrix 207, a substrate 210 that is a counter substrate, a polarizing plate 231, and a polarizing plate 233. The sealing region includes a sealant 282, a terminal electrode layer 287, an anisotropic conductive layer 285, and an FPC 286.

In this embodiment mode, the spherical spacer 281 attached with an adhesive is positioned over the insulating film 202 with an organosilane film interposed therebetween.

Also in the method for manufacturing a liquid crystal display device of this embodiment mode, after the spherical spacer 281 attached with an adhesive is positioned over the insulating film 202 by a droplet discharge method, the insulating layer 203 functioning as an alignment film is formed, rubbing treatment is performed, and then the substrates are attached to each other. In the step of positioning the spherical spacer, first, an organosilane film having a hydrolytic group is formed as liquid-repellent treatment, and a liquid containing a spherical spacer attached with an adhesive is discharged by a droplet discharge method. As the liquid is dried, the spherical spacer moves toward the center of the liquid and the positioning thereof is corrected. Subsequently, the adhesive is heated to fix the spherical spacer, the organosilane film having a hydrolytic group is selectively removed, and lyophilic treatment is performed.

In this embodiment mode, in order to maintain the space between the substrates and control the thickness of the liquid crystal layer, the spherical spacer is positioned in the liquid crystal display device by a droplet discharge method. A region onto which the spherical spacer is discharged is subjected to liquid-repellent treatment in order to reduce the wettability with respect to the liquid in which the spherical spacer is dispersed. As a result of the liquid-repellent treatment, the liquid (the droplet) in which the spherical spacer is dispersed lands on a liquid-repellent treatment region while maintaining a large contact angle with respect to the liquid-repellent treatment region. The liquid does not spread over the liquid-repellent region and is dried while moving the spherical spacer toward the center of the liquid. Therefore, the spherical spacer can be positioned in the center of the liquid, which is the position where the liquid is controlled to be discharged. Thus, incorrect positioning shortly after discharging, which has been caused by the loss of control in the droplet, can be corrected by moving the spherical spacer while drying the droplet.

In this embodiment mode, by using the spherical spacer attached with an adhesive, in which the adhesive with the substrate is provided on the periphery of the spherical spacer, heat treatment can be performed after drying a droplet and the spherical spacer can be fixed to the substrate (the conductive layer) with the adhesive.

Since a spherical spacer easily moves, it is often positioned over an insulating layer functioning as an alignment film. However, in the present invention, an insulating layer functioning as an alignment film is formed over a spherical spacer that is positioned over a substrate and fixed thereto, and then subjected to rubbing treatment; thus, the spherical spacer can be positioned in a liquid crystal display device with high positioning accuracy.

A gate electrode layer, a source electrode layer, and a drain electrode layer of the transistor 220 that is an inverted-staggered thin film transistor manufactured in this embodiment mode are formed by a droplet discharge method. The droplet discharge method is a method in which a composition containing a liquid conductive material is discharged and solidified by drying and baking to form a conductive layer and an electrode layer. If a composition containing an insulating material is discharged and solidified by drying and baking, an insulating layer can also be formed. When a droplet discharge method is employed, a constituent of a liquid crystal display device, such as a conductive layer and an insulating layer, can be selectively formed, which can simplify the process and reduce a waste of materials; therefore, the liquid crystal display device can be manufactured at low cost and with high productivity.

In this embodiment mode, an amorphous semiconductor is used as a semiconductor layer, and a semiconductor layer having one conductivity type may be formed as needed. In this embodiment mode, a semiconductor layer and an n-type amorphous semiconductor layer as a semiconductor layer having one conductivity type are stacked. Furthermore, an NMOS structure including an n-channel thin film transistor provided with an n-type semiconductor layer, a PMOS structure including a p-channel thin film transistor provided with a p-type semiconductor layer, or a CMOS structure including an n-channel thin film transistor and a p-channel thin film transistor can be manufactured. In this embodiment mode, the transistor 220 is an n-channel inverted-staggered thin film transistor. The transistor 220 may be a channel protective type inverted-staggered thin film transistor in which a protective layer is provided over a channel region of the semiconductor layer.

In addition, an n-channel thin film transistor or a p-channel thin film transistor can also be formed by doping the semiconductor layer with an element imparting conductivity to form an impurity region. Instead of forming the n-type semiconductor layer, plasma treatment may be performed with a $PH_3$ gas to impart conductivity to the semiconductor layer.

Alternatively, the semiconductor layer may be formed using an organic semiconductor material as a semiconductor by a printing method, a spray method, a spin coating method, a droplet discharge method, a dispenser method, or the like. In that case, since an etching step is not required, the number of steps can be reduced. As an organic semiconductor, a low molecular material such as pentacene or a high molecular material can be used, or a material such as an organic pigment or a conductive high molecular organic material can be used. As an organic semiconductor material used in the present invention, a π-conjugated high molecular material having a skeleton constituted by a conjugated double bond is preferably used. Typically, a soluble high molecular material such as polythiophene, polyfluorene, poly(3-alkylthiophene), or a polythiophene derivative can be used.

Next, a structure of a backlight unit 352 is described. The backlight unit 352 includes a light source 331 that emits light, such as a cold cathode tube, a hot cathode tube, a light emitting diode, an inorganic EL, or an organic EL, a lamp reflector 332 for effectively leading light to a light guiding plate 335, the light guiding plate 335 for totally reflecting light so that light is led to the entire surface of a liquid crystal display device, a diffusing plate 336 for reducing variations in brightness, and a reflector plate 334 for reusing light leaked under the light guiding plate 335.

The backlight unit 352 is connected to a control circuit for adjusting the luminance of the light source 331. The luminance of the light source 331 can be controlled by a signal supplied from the control circuit.

In the step of positioning a spherical spacer, the spherical spacer is discharged by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

This embodiment mode can be combined with Embodiment Mode 1 as appropriate. As the materials and manufacturing method of the electrode layers, the insulating layers, and the like included in the liquid crystal display device, the description of Embodiment Mode 2 can be referred to and applied as appropriate.

Embodiment Mode 6

Described in this embodiment mode is operation of each circuit included in a liquid crystal display device of the present invention.

Figure 13A:
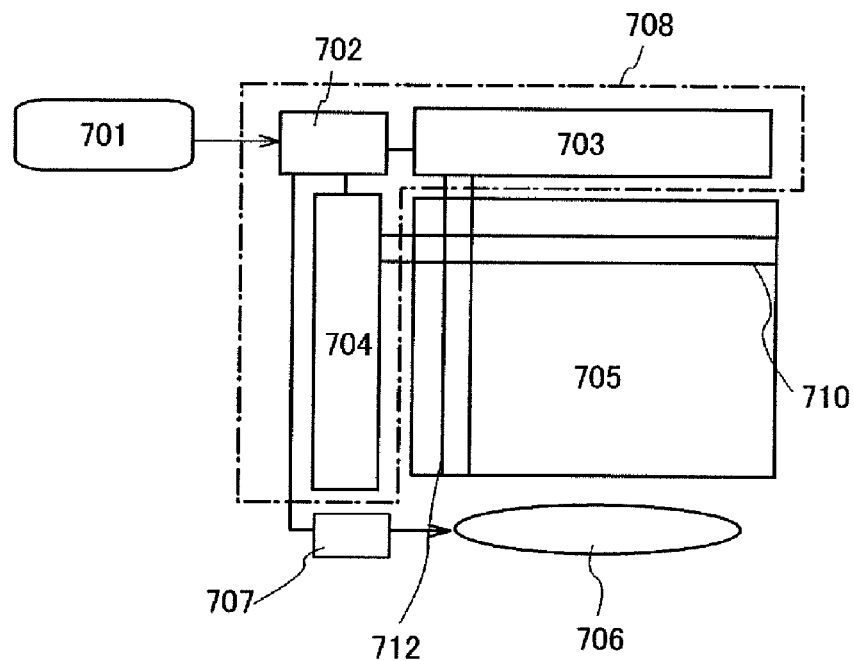
FIGS. 13A to 13C are block diagrams each illustrating a liquid crystal display device according to an aspect of the present invention.
Figure 13B:
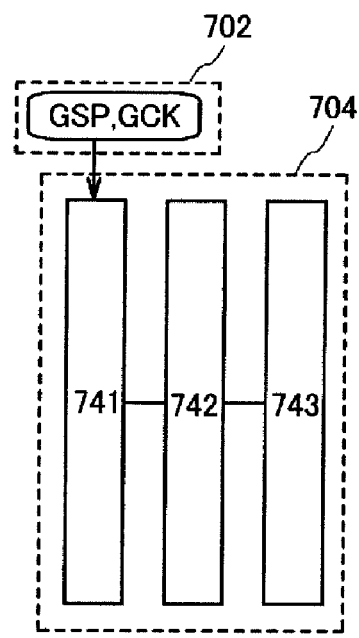
Figure 13C:
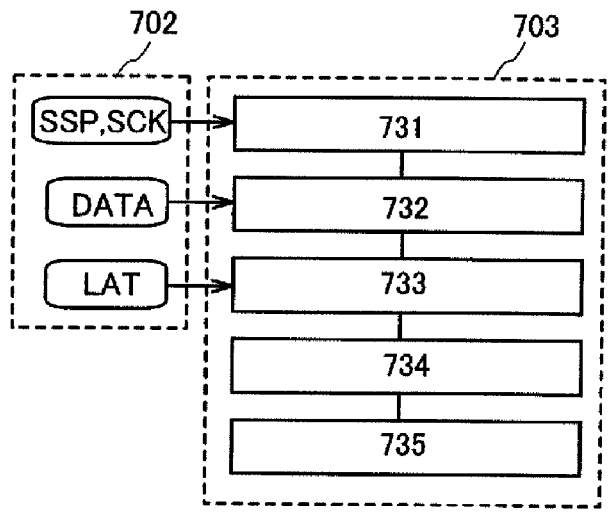

FIGS. 13A to 13C are system block diagrams of a pixel portion 705 and a driver circuit portion 708 in a liquid crystal display device.

The pixel portion 705 includes a plurality of pixels each formed by an intersection of a signal line 712 and a scanning line 710. A switching element is provided in each intersection region. The switching element makes it possible to control the applied voltage for controlling the tilt of liquid crystal molecules. Such a structure in which a switching element is provided in each intersection region is called an active matrix type. The pixel portion of the present invention is not limited to such an active matrix type, and may have a passive matrix structure instead. The passive matrix type is manufactured by a simple process because a switching element is not included in each pixel.

The driver circuit portion 708 includes a control circuit 702, a signal line driver circuit 703, and a scanning line driver circuit 704. The control circuit 702 has a function of controlling a gray scale in accordance with contents to be displayed in the pixel portion 705. Accordingly, the control circuit 702 inputs a generated signal to the signal line driver circuit 703 and the scanning line driver circuit 704. When a switching element is selected by the scanning line driver circuit 704 through the scanning line 710, voltage is applied to a pixel electrode in a selected intersection region. A value of this voltage is determined based on a signal inputted from the signal line driver circuit 703 through the signal line.

Furthermore, in the control circuit 702, a signal for controlling electric power supplied to a lighting means 706 is generated. The signal is inputted to a power supply 707 of the lighting means 706. As the lighting means, the back light unit described in the aforementioned embodiment mode can be used. Note that the lighting means may be a front light instead of the backlight unit. A front light is a plate-like light unit that is attached to a front surface side of the pixel portion and includes an illuminant and a light guiding body for illuminating the whole liquid crystal display device. With such a lighting unit, the pixel portion can be uniformly illuminated with low power consumption.

As illustrated in FIG. 13B, the scanning line driver circuit 704 includes a shift register 741, a level shifter 742, and a circuit functioning as a buffer 743. Signals such as a gate start pulse (GSP) and a gate clock signal (GCK) are inputted to the shift register 741. Note that the structure of the scanning line driver circuit of the present invention is not limited to that illustrated in FIG. 13B.

As illustrated in FIG. 13C, the signal line driver circuit 703 includes a shift register 731, a first latch 732, a second latch 733, a level shifter 734, and a circuit functioning as a buffer 735. The circuit functioning as the buffer 735 is a circuit for amplifying a weak signal and includes an operational amplifier and the like. Signals such as a start pulse (SSP) and a clock signal (SCK) are inputted to the shift register 731 and data (DATA) such as a video signal are inputted to the first latch 732. Latch (LAT) signals can be temporarily held in the second latch 733, and they are inputted to the pixel portion 705 at a time. Such operation is referred to as line sequential driving. If the pixels perform dot sequential driving instead of the line sequential driving, the second latch is not required. Thus, the structure of the signal line driver circuit of the present invention is not limited to that illustrated in FIG. 13C.

The signal line driver circuit 703, the scanning line driver circuit 704, and the pixel portion 705 described above can be formed using semiconductor elements provided over one substrate. The semiconductor elements can be formed using a thin film transistor formed over a glass substrate. In that case, a crystalline semiconductor film may be applied to the semiconductor elements (see Embodiment Mode 4). A crystalline semiconductor film can constitute a circuit included in a driver circuit portion because of its high electrical characteristics, in particular, high mobility. Furthermore, the signal line driver circuit 703 and the scanning line driver circuit 704 can be mounted on the substrate with the use of an integrated circuit (IC) chip. In that case, an amorphous semiconductor film can be applied to the semiconductor elements in the pixel portion (see Embodiment Mode 5).

Therefore, in this embodiment mode, a liquid crystal display device with improved performance and image quality can be manufactured with high yield.

This embodiment mode can be combined with any of Embodiment Modes 1 to 5 as appropriate.

Embodiment Mode 7

Described in this embodiment mode is a structure of a backlight that is a lighting means capable of being used for a liquid crystal display device of the present invention. A backlight is provided in a liquid crystal display device as a backlight unit having a light source. In the backlight unit, the light source is surrounded by a reflector plate so that light is scattered efficiently.

Figure 10A:
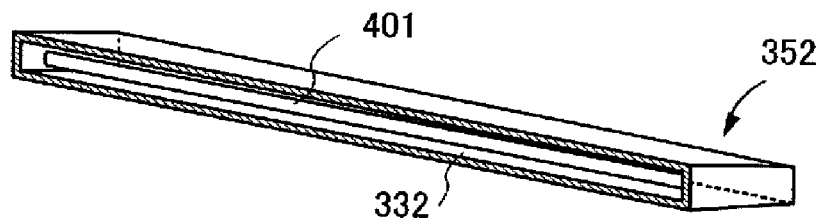
FIGS. 10A to 10D are views each illustrating a backlight that can be used for a liquid crystal display device of the present invention.

As illustrated in FIG. 10A, a cold cathode tube 401 can be used as a light source in a backlight unit 352. In order to efficiently reflect light from the cold cathode tube 401, a lamp reflector 332 can be provided. The cold cathode tube 401 is often used for a large-sized liquid crystal display device due to high luminance from the cold cathode tube. Accordingly, the backlight unit having a cold cathode tube can be used for a display of a personal computer.

Figure 10B:
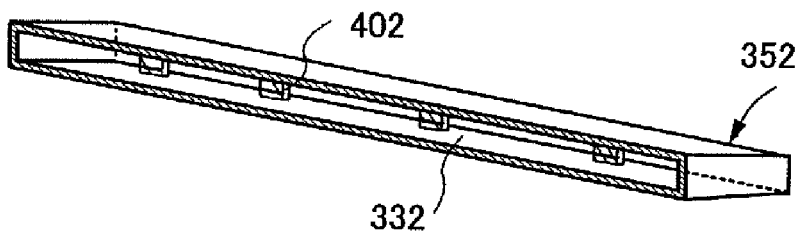

As illustrated in FIG. 10B, a light emitting diode 402 can be used as a light source in the backlight unit 352. For example, light emitting diodes 402 that emit white light are arranged at predetermined intervals. In order to efficiently reflect light from the light emitting diode 402, the lamp reflector 332 can be provided.

Figure 10C:
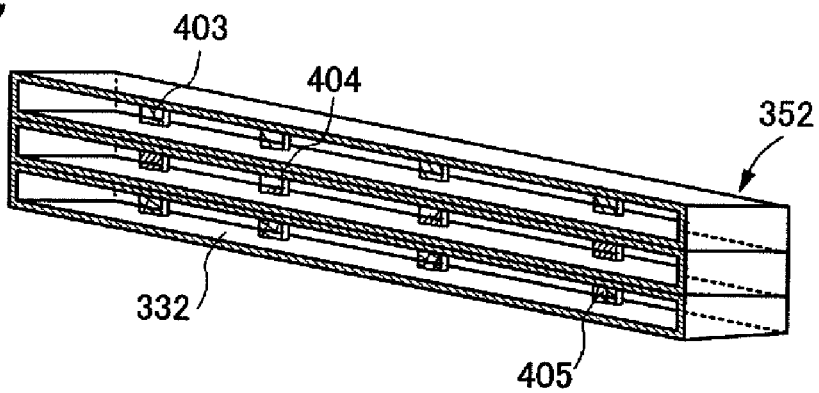

As illustrated in FIG. 10C, light emitting diodes 403, 404 and 405 that emit light of colors of RGB can be used as a light source in the backlight unit 352. By using the light emitting diodes 403, 404 and 405 that emit light of colors of RGB, color reproducibility can be enhanced as compared with the case where only the light emitting diode 402 that emits white light is used. In order to efficiently reflect light from the light emission diodes, the lamp reflector 332 can be provided.

Figure 10D:
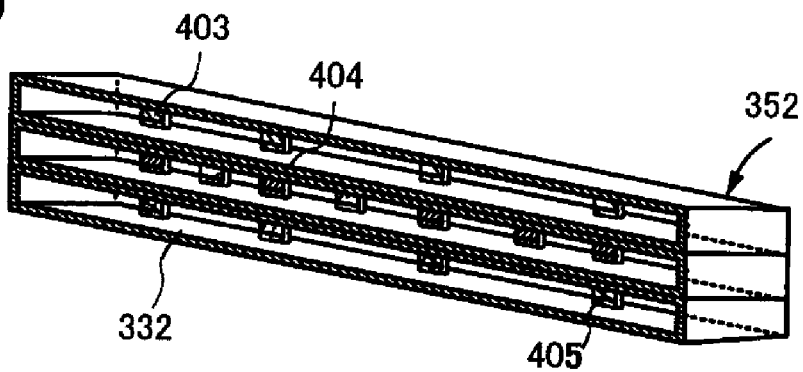

As illustrated in FIG. 10D, when the light emitting diodes 403, 404 and 405 that emit light of colors of RGB are used as a light source, it is not necessary that the number and arrangement thereof be the same. For example, the number of light emitting diodes that emit light of a color with low emission intensity may be larger than the number of light emitting diodes that emit light of other colors.

Further, the light emitting diode 402 that emits white light and the light emitting diodes 403, 404 and 405 (LED) that emit light of colors of RGB may be combined.

When a field sequential mode is applied in the case of using the light emitting diodes of RGB, color display can be performed by sequentially lighting the light emitting diodes of RGB in accordance with the time.

The light emitting diode is suitable for a large-sized liquid crystal display device because of its high luminance. In addition, color reproducibility of the light emitting diode is superior to that of a cold cathode tube because the color purity of each color of RGB is favorable, and the occupied area can be reduced. Therefore, a narrower frame can be achieved when the light emitting diode is applied to a small-sized liquid crystal display device.

A light source is not necessarily provided in the backlight units illustrated in FIGS. 10A to 10D. For example, when a backlight having light emitting diodes is mounted on a large-sized liquid crystal display device, the light emitting diodes can be disposed on the back side of the substrate. In that case, the light emitting diodes can be arranged at predetermined intervals. The arrangement of the light emitting diodes improves the color reproducibility.

In the present invention, by using such a backlight, a liquid crystal display device with improved image quality and performance can be manufactured with high yield. A backlight having a light emitting diode is particularly suitable for a large-sized liquid crystal display device, and a high quality image can be displayed even in a dark place by enhancing the contrast ratio of the large-sized liquid crystal display device.

This embodiment mode can be combined with any of Embodiment Modes 1 to 6 as appropriate.

Embodiment Mode 8

Described in this embodiment mode is an example of a liquid crystal display device that is improved in image quality and reliability and can be manufactured with high yield. Specifically, a liquid crystal display module using the present invention is described.

This embodiment mode is described with reference to FIGS. 9A and 9B. FIGS. 9A and 9B each illustrate an example of a liquid crystal display device (liquid crystal display module) structured using an element substrate 2600 that is manufactured using the present invention.

FIG. 9A illustrates an example of a liquid crystal display module, in which the element substrate 2600 and a counter substrate 2601 are attached to each other with a sealant 2602, and a pixel portion 2603 including TFTs and the like, a liquid crystal layer 2604, and a coloring layer 2605 are provided between the substrates to form a display region. The coloring layer 2605 is necessary to perform color display. In the case of the RGB system, coloring layers corresponding to respective colors of red, green, and blue are provided for each pixel. A polarizing plate 2606 is provided on the outer side of the counter substrate 2601, and a polarizing plate 2607 and a diffusing plate 2613 are provided on the outer side of the element substrate 2600. A light source includes a cold cathode tube 2610 and a reflector plate 2611. A circuit board 2612, which is connected to the element substrate 2600 through a flexible wiring board 2609, includes external circuits such as a control circuit and a power supply circuit. Reference numeral 2608 denotes a driver circuit. The polarizing plate and the liquid crystal layer may be stacked with a retardation plate interposed therebetween.

FIGS. 9A and 9B illustrate an example of the liquid crystal display device, in which the polarizing plate 2606 and the coloring layer 2605 are provided on the outer side (viewing side) and the inner side of the counter substrate 2601, respectively; however, the polarizing plate 2606 and the coloring layer 2605 may be provided on the inner side (liquid crystal side) and the outer side of the counter substrate 2601, respectively. Furthermore, the stacked structure of the polarizing plate 2606 and the coloring layer 2605 is not limited to that illustrated in FIG. 9A, and may be determined as appropriate depending on the material of the polarizing plate 2606 and the coloring layer 2605 or the conditions of the manufacturing process.

The liquid crystal display module can employ a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optical compensated birefringence) mode, an FLC (ferroelectric liquid crystal) mode, an AFLC (anti ferroelectric liquid crystal) mode, or the like.

FIG. 9B illustrates an example of applying an FS mode to the liquid crystal display module of FIG. 9A, that is, FIG. 9B illustrates an FS-LCD (field sequential-LCD). The FS-LCD emits red light, green light and blue light during one frame period and can perform color display by combining images using a time division method. In addition, since light emission of each color is performed using a light emitting diode, a cold cathode tube, or the like, no color filter is required. Accordingly, it is not necessary to arrange color filters of the three primary colors and limit the display region of each color, and thus color display of all three colors can be performed in any region. On the other hand, light emission of the three colors is performed in one frame period; therefore, high-speed response of liquid crystal is needed. By applying the FS mode to the liquid crystal display device of the present invention, a liquid crystal display device or a liquid crystal television device with high performance and high image quality can be completed.

The optical response speed of the liquid crystal display module is increased by narrowing the cell gap of the liquid crystal display module. Alternatively, the optical response speed can be increased by reducing the viscosity of the liquid crystal material. The optical response speed can be further increased by an overdrive method in which an applied voltage is increased (or decreased) only for a moment.

FIG. 9B illustrates a transmissive liquid crystal display module in which a red light source 2910a, a green light source 2910b and a blue light source 2910c are provided as light sources. A controller 2912 is provided for switching ON or OFF of each of the red light source 2910a, the green light source 2910b and the blue light source 2910c. The controller 2912 controls the light emission of each color so that light enters the liquid crystal and color display is performed by combining images using a time division method.

Also in this embodiment mode, as described in Embodiment Mode 1, in the step of positioning a spherical spacer, the spherical spacer is discharged onto a liquid-repellent treatment region by a droplet discharge method, and incorrect positioning shortly after discharging of the spherical spacer, which has been caused by the loss of control in the droplet, can be corrected by moving the spherical spacer while drying the droplet.

A spherical spacer can be accurately positioned in a non-display region such as a black matrix (a light shielding film) or a wiring; therefore, it is possible to prevent display defects such as damage due to movement of the spherical spacer in a display region, light leakage, and alignment disorder on the periphery of the spherical spacer. Furthermore, the space between substrates can be maintained more uniformly than in the case of using a columnar spacer the thickness of which is difficult to be controlled at the time of formation.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

This embodiment mode can be combined with any of Embodiment Modes 1 to 7 as appropriate.

Embodiment Mode 9

Figure 14:
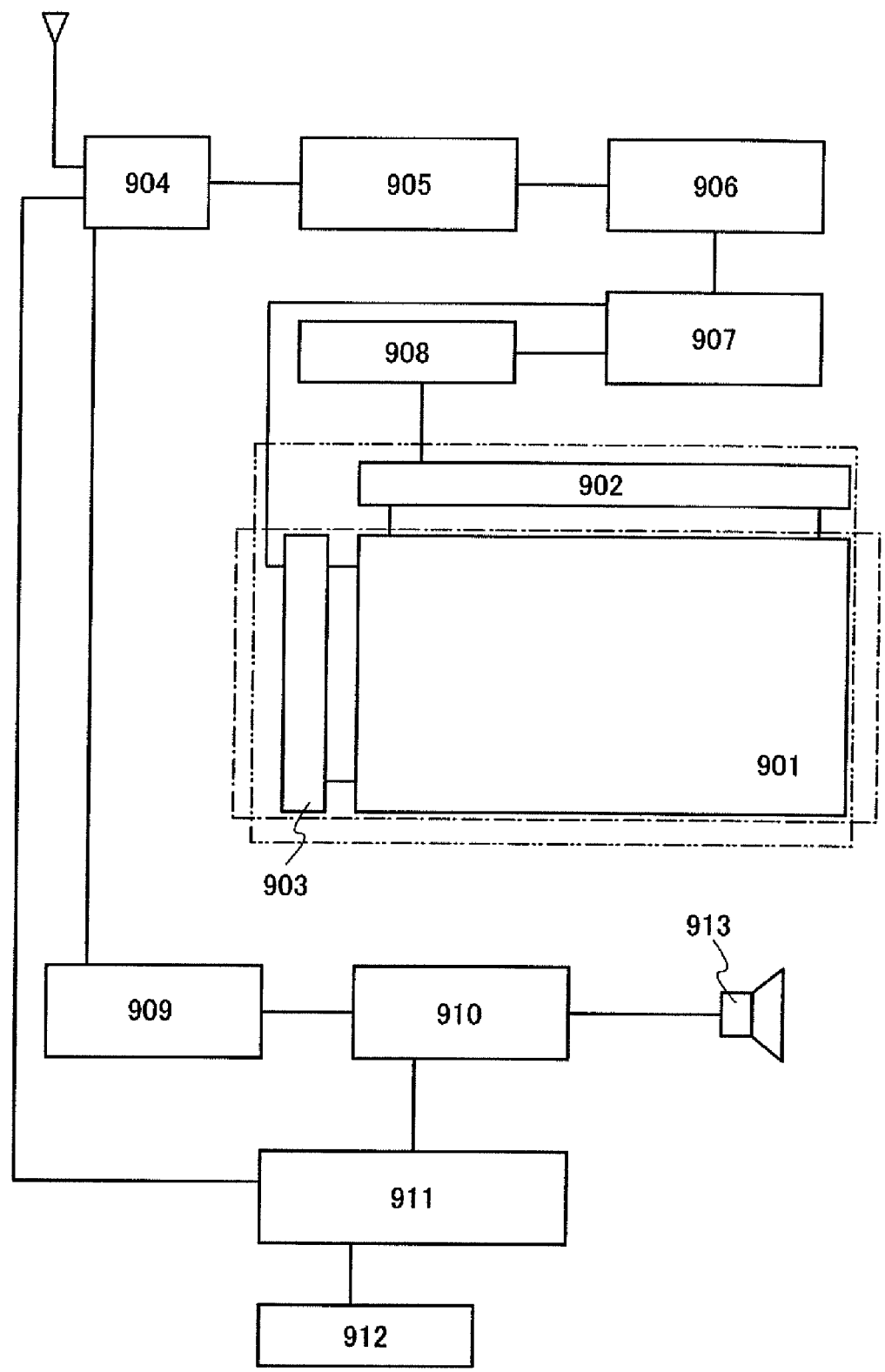
FIG. 14 is a block diagram illustrating a main structure of an electronic appliance to which the present invention is applied.

A television device (also simply referred to as a television or a television receiver) can be completed using a liquid crystal display device formed by the present invention. FIG. 14 is a block diagram illustrating main components of the television device.

As for a display panel in FIG. 14, there are the following cases: the case where only a pixel portion 901 is formed as illustrated in FIG. 11A and a scanning line driver circuit 903 and a signal line driver circuit 902 are mounted by a TAB method as illustrated in FIG. 12B or by a COG method as illustrated in FIG. 12A; the case where a TFT is formed as illustrated in FIG. 11B, the pixel portion 901 and the scanning line driver circuit 903 are formed over a substrate, and the signal line driver circuit 902 is separately mounted as a driver IC; the case where the pixel portion 901, the signal line driver circuit 902, and the scanning line driver circuit 903 are formed over the same substrate as illustrated in FIG. 11C; and the like. The display panel may have any of the structures.

As another external circuit in FIG. 14, an image signal amplifier circuit 905 that amplifies an image signal included in signals received by a tuner 904, an image signal processing circuit 906 that converts the signals outputted from the image signal amplifier circuit 905 into chrominance signals corresponding to colors of red, green and blue, a control circuit 907 that converts the image signals into an input specification for a driver IC, and the like are provided on an input side of the image signal. The control circuit 907 outputs signals to both a scanning line side and a signal line side. In the case of digital driving, a signal dividing circuit 908 may be provided on the signal line side and an input digital signal may be divided into m pieces to be supplied.

An audio signal among signals received by the tuner 904 is transmitted to an audio signal amplifier circuit 909 and an output therefrom is supplied to a speaker 913 through an audio signal processing circuit 910. A control circuit 911 receives control information such as a receiving station (reception frequency) or sound volume from an input portion 912 and transmits signals to the tuner 904 and the audio signal processing circuit 910.

Figure 15A:
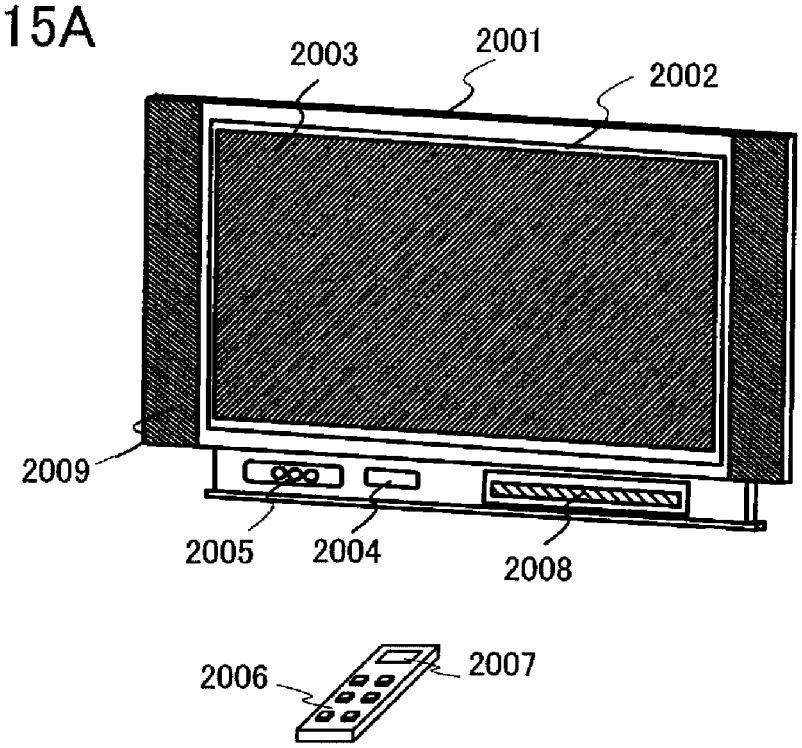
FIGS. 15A and 15B are diagrams each illustrating an electronic appliance according to an aspect of the present invention.
Figure 15B:
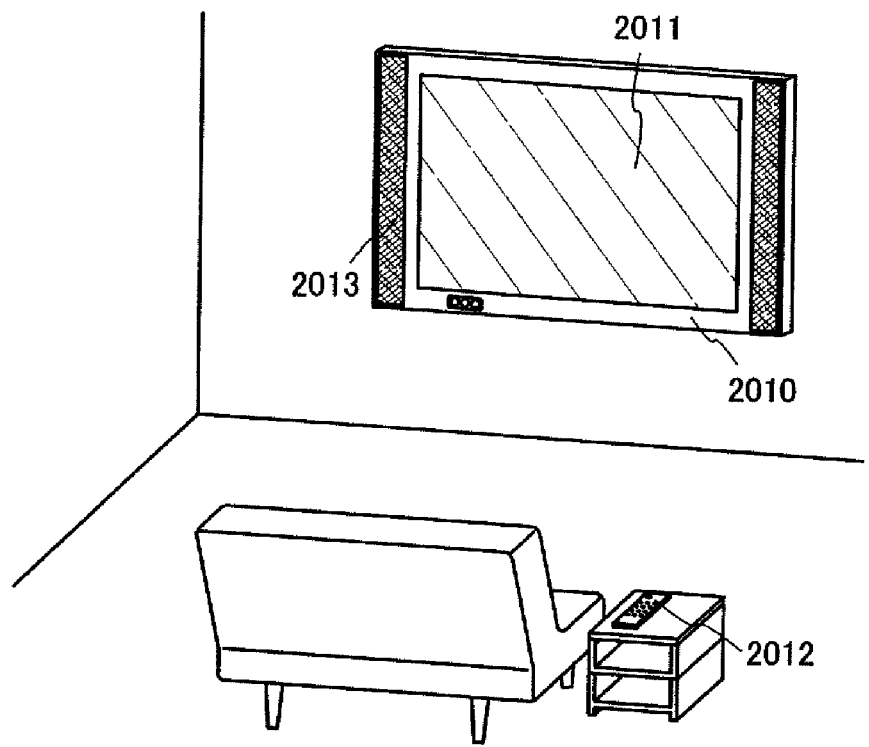

A television device can be completed by incorporating the display module into a housing, as illustrated in FIGS. 15A and 15B. When a liquid crystal display module is used as a display module, a liquid crystal television device can be manufactured. In FIG. 15A, a main screen 2003 is formed using a display module and accessories such as a speaker portion 2009 and an operation switch are provided. In this manner, a television device can be completed by the present invention.

A display panel 2002 is incorporated in a housing 2001. The television device can receive general TV broadcast with a receiver 2005. When the television device is connected to a communication network by wired or wireless connections via a modem 2004, one-way (from a sender to a receiver) or two-way (between a sender and a receiver or between receivers) information communication can be performed. The television device can be operated by a switch built in the housing, or a remote control unit 2006 that is provided separately. The remote control unit 2006 may also have a display portion 2007 for displaying information to be outputted.

The television device may also include a sub screen 2008 formed using a second display panel for displaying channels, sound volume, and the like, in addition to the main screen 2003. In this structure, both the main screen 2003 and the sub screen 2008 may be formed using a liquid crystal display device of the present invention. By using the present invention, a liquid crystal display device with higher image quality and reliability can be manufactured even when a large substrate and a number of TFTs and electronic parts are used.

FIG. 15B illustrates a television device having a large-sized display portion, for example, a 20-inch to 80-inch display portion. The television device includes a housing 2010, a display portion 2011, a remote control unit 2012 that is an operation portion, a speaker portion 2013, and the like. The present invention is applied to the display portion 2011. The television device in FIG. 15B is a wall-hanging type, and does not require a large installation space.

Needles to say, the present invention is not limited to a television device. The present invention can be applied to various applications, particularly to large-sized display media such as an information board at train stations, airports, or the like, or an advertising display screen on the street, as well as a monitor of a personal computer.

This embodiment mode can be combined with any of Embodiment Modes 1 to 8 as appropriate.

Embodiment Mode 10

Examples of electronic appliances using the present invention are as follows: a television device (also simply referred to as a television or a television receiver), a camera such as a digital camera or a digital video camera, a cellular telephone device (also simply referred to as a cellular phone or a cellphone), a portable information terminal such as a PDA, a portable game machine, a computer monitor, a computer, a sound reproducing device such as a car audio system, an image reproducing device including a recording medium, such as a home-use game machine, and the like. Furthermore, the present invention can be applied to any game machine having a liquid crystal display device, such as a pachinko machine, a slot machine, a pinball machine, a large-scale game machine, and the like. Specific examples are described with reference to FIGS. 16A to 16F.

Figure 16A:
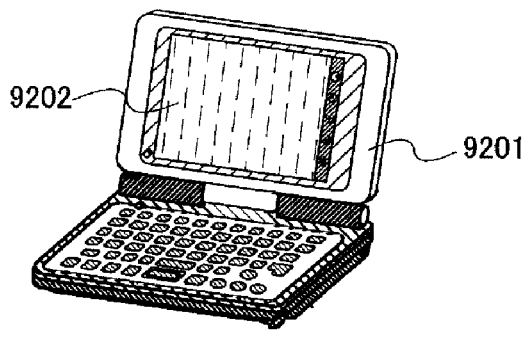
FIGS. 16A to 16F are diagrams each illustrating an electronic appliance according to an aspect of the present invention.

A portable information terminal device illustrated in FIG. 16A includes a main body 9201, a display portion 9202, and the like. The liquid crystal display device of the present invention can be applied to the display portion 9202. As a result, a high performance portable information terminal device that can display a high quality image with high visibility can be provided.

Figure 16B:
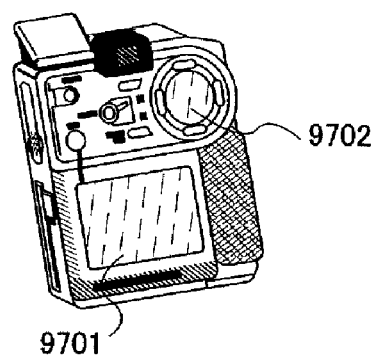

A digital video camera illustrated in FIG. 16B includes a display portion 9701, a display portion 9702, and the like. The liquid crystal display device of the present invention can be applied to the display portion 9701. As a result, a high performance digital video camera that can display a high quality image with high visibility can be provided.

Figure 16C:
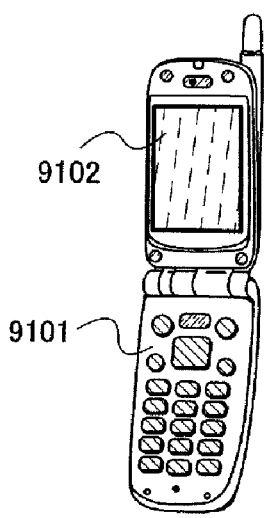

A cellular phone illustrated in FIG. 16C includes a main body 9101, a display portion 9102, and the like. The liquid crystal display device of the present invention can be applied to the display portion 9102. As a result, a high performance cellular phone that can display a high quality image with high visibility can be provided.

Figure 16D:
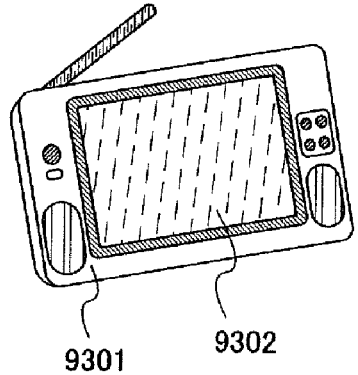

A portable television device illustrated in FIG. 16D includes a main body 9301, a display portion 9302, and the like. The liquid crystal display device of the present invention can be applied to the display portion 9302. As a result, a high performance portable television device that can display a high quality image with high visibility can be provided. Furthermore, for the television device, the liquid crystal display device of the present invention can be applied to a wide range of television devices: small devices installed in portable terminals such as cellular phones; mid-sized devices that can be picked up and carried; and large-sized devices (for example, 40-inch displays and above).

Figure 16E:
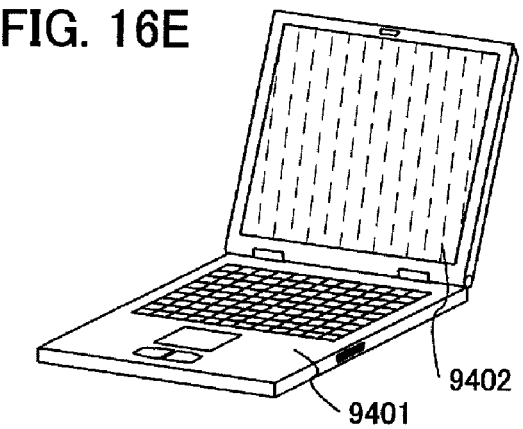

A portable computer illustrated in FIG. 16E includes a main body 9401, a display portion 9402, and the like. The liquid crystal display device of the present invention can be applied to the display portion 9402. As a result, a high performance portable computer that can display a high quality image with high visibility can be provided.

Figure 16F:
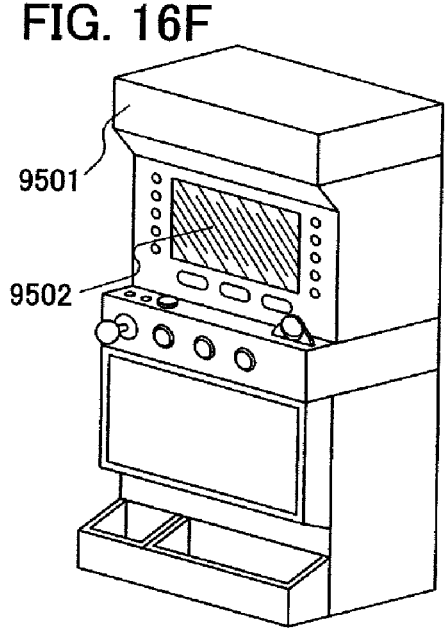

A slot machine illustrated in FIG. 16F includes a main body 9501, a display portion 9502, and the like. The liquid crystal display device of the present invention can be applied to the display portion 9502. As a result, a high performance slot machine that can display a high quality image with high visibility can be provided.

As set forth above, by the liquid crystal display device of the present invention, high performance electronic appliances that can display a high quality image with high visibility can be provided.

This embodiment mode can be combined with any of Embodiment Modes 1 to 9 as appropriate.

Embodiment 1

Shown in this embodiment is the experimental result in which a spherical spacer is positioned by a droplet discharge method using the present invention.

A light shielding film (black matrix) was formed over a glass substrate, an insulating layer was formed over the light shielding film, and a conductive layer was formed over the insulating layer. As the light shielding film, a molybdenum film (with a thickness of 100 nm) was formed by a sputtering method, and was etched using a mask to be processed into a pattern. As the insulating layer for planarization, an acrylic resin film (with a thickness of 3 μm) was formed by a spin coating method. As the conductive layer, a light transmitting conductive layer was formed by forming an indium tin oxide film added with silicon oxide (ITSO film) (with a thickness of 110 nm) by a sputtering method.

The conductive layer was irradiated with ultraviolet rays in an ozone atmosphere for 10 minutes so as to remove organic impurities on a surface of the conductive layer, and then liquid-repellent treatment was performed. As the liquid-repellent treatment, an FAS film was deposited (deposition conditions: by a vapor phase method at a temperature of 120° C. for 30 minutes in a nitrogen atmosphere), and the FAS film was immersed in hydrofluoroether and then in ethanol.

A liquid in which a spherical spacer attached with an adhesive (KSE-400 manufactured by Natoko. Co., Ltd.) is dispersed at 0.1 wt % was discharged by a droplet discharge method onto the conductive layer that had been subjected to the liquid-repellent treatment. As a dispersion medium in the liquid, triethylene glycol monobutyl ether was used, and the liquid including a spherical spacer was obtained by dispersing the spherical spacer by ultrasonic before discharging.

The liquid was discharged onto a region over the conductive layer, which overlaps with the light shielding film that is in a non-display region. Then, drying was performed at 100° C. for five minutes and baking was performed at 150° C. for one hour. Ultraviolet irradiation was performed in an ozone atmosphere to remove the FAS film that is a liquid-repellent agent.

Figure 18:
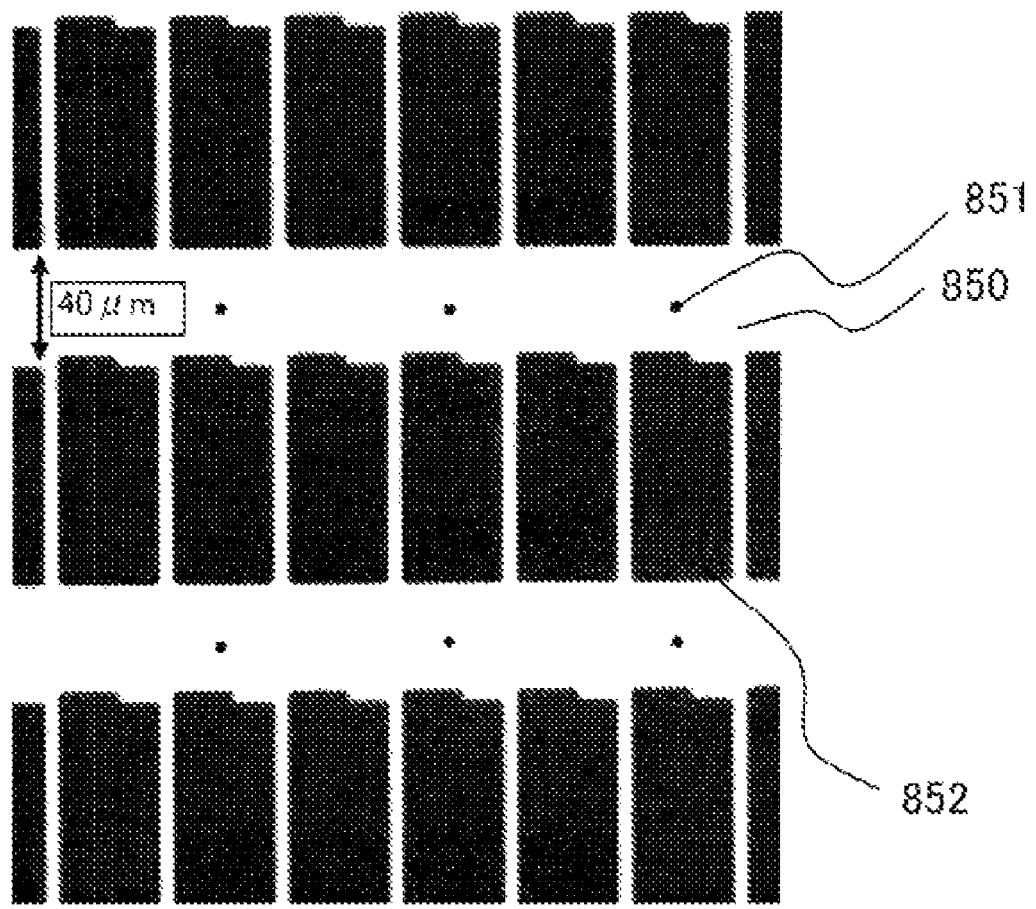
FIG. 18 is an optical micrograph illustrating the positioning of a spherical spacer described in Embodiment 1.

FIG. 18 is an optical micrograph of a sample manufactured in the aforementioned steps, which was observed under episcopic illumination. As shown in FIG. 18, a light shielding film 850 has a pattern surrounding a pixel display region. A spherical spacer 851 is not positioned in the pixel display region, but is regularly positioned over a conductive layer 852 overlapping with the light shielding film 850. It was confirmed that incorrect positioning of the spherical spacer in the droplet could be corrected by drying the liquid over the liquid-repellent region. In this embodiment, the number of spherical spacers positioned in a single discharging step was five or less.

From the aforementioned result, it has been confirmed that by using the present invention, the spherical spacer can be accurately positioned in a non-display region such as a black matrix (a light shielding film) or a wiring. Accordingly, it is possible to prevent display defects such as damage due to movement of the spherical spacer in a display region, light leakage, and alignment disorder on the periphery of the spherical spacer. Furthermore, the space between the substrates can be maintained more uniformly than in the case of using a columnar spacer the thickness of which is difficult to be controlled at the time of formation.

In addition, the use of a droplet discharge method makes it possible to reduce expensive equipment such as a large vacuum apparatus, and thus high material-use efficiency, decreased cost, and increased productivity can be achieved.

As a result, in a liquid crystal display device, the positioning of a spherical spacer can be controlled more accurately, display defects due to incorrect positioning in a display region can be prevented, and the space between substrates can be maintained uniformly. Furthermore, a liquid crystal display device with superior visibility and higher image quality and reliability can be manufactured with high yield.

This application is based on Japanese Patent Application serial no. 2007-281124 filed with Japan Patent Office on Oct. 30, 2007, the entire contents of which are hereby incorporated by reference.

What is claimed is:

1. A method for manufacturing a liquid crystal display device, comprising the steps of:
    forming an organosilane film having a hydrolytic group over a substrate;
    discharging a liquid in which a spherical spacer attached with an adhesive is dispersed onto the organosilane having the hydrolytic group;
    drying the liquid;
    fixing the spherical spacer to the substrate with the adhesive by applying heat treatment to the spherical spacer attached with the adhesive; and
    removing a part of the organosilane film having the hydrolytic group using the spherical spacer as a mask.

2. The method for manufacturing the liquid crystal display device, according to claim 1, further comprising the step of forming an alignment film over the spherical spacer and the substrate.

3. The method for manufacturing the liquid crystal display device, according to claim 2, wherein the alignment film is subjected to rubbing treatment.

4. The method for manufacturing the liquid crystal display device, according to claim 1, wherein the organosilane film having the hydrolytic group has a fluorocarbon chain.

5. The method for manufacturing the liquid crystal display device, according to claim 1, wherein the spherical spacer attached with the adhesive is discharged onto a region overlapping a light shielding film formed over the substrate.

6. The method for manufacturing the liquid crystal display device, according to claim 1, wherein the part of the organosilane film having the hydrolytic group is removed by ultraviolet irradiation in an atmosphere containing oxygen.

7. The method for manufacturing the liquid crystal display device, according to claim 1, wherein the spherical spacer is moved by drying the liquid.

8. The method for manufacturing the liquid crystal display device, according to claim 1, wherein the spherical spacer is coated with the adhesive.

9. A method for manufacturing a liquid crystal display device, comprising the steps of:
    forming a conductive layer over a substrate;

forming an organosilane film having a hydrolytic group over the conductive layer;

discharging a liquid in which a spherical spacer attached with an adhesive is dispersed onto the organosilane film having the hydrolytic group;

drying the liquid;

fixing the spherical spacer to the substrate with the adhesive by applying heat treatment to the spherical spacer attached with the adhesive; and removing a part of the organosilane film having the hydrolytic group using the spherical spacer as a mask.

10. The method for manufacturing the liquid crystal display device, according to claim 9, further comprising the step of forming an alignment film over the spherical spacer and the substrate.

11. The method for manufacturing the liquid crystal display device, according to claim 10, wherein the alignment film is subjected to rubbing treatment.

12. The method for manufacturing the liquid crystal display device, according to claim 9, wherein the organosilane film having the hydrolytic group has a fluorocarbon chain.

13. The method for manufacturing the liquid crystal display device, according to claim 9, wherein the spherical spacer attached with the adhesive is discharged onto a region overlapping a light shielding film formed over the substrate.

14. The method for manufacturing the liquid crystal display device, according to claim 9, wherein the part of the organosilane film having the hydrolytic group is removed by ultraviolet irradiation in an atmosphere containing oxygen.

15. The method for manufacturing the liquid crystal display device, according to claim 9, wherein the spherical spacer is moved by drying the liquid.

16. The method for manufacturing the liquid crystal display device, according to claim 9, wherein the spherical spacer is coated with the adhesive.

17. A liquid crystal display device comprising:
a first substrate;
a semiconductor element formed over the first substrate;
a liquid crystal over the semiconductor element;
a spherical spacer over the semiconductor element;
a layer having liquid repellency over the spherical spacer and the liquid crystal; and
a second substrate over the layer,
wherein the spherical spacer is fixed on the layer with an adhesive, and
wherein in a diameter of the spherical spacer exceeds a width of the layer direction parallel to the surface of the first substrate over which the semiconductor element is formed.

18. The liquid crystal display device, according to claim 17, wherein a diameter of the layer is smaller than a diameter of the spherical spacer.

19. The liquid crystal display device, according to claim 17, further comprising an alignment film formed between the liquid crystal and the spherical spacer.

20. The liquid crystal display device, according to claim 19, wherein the alignment film is subjected to rubbing treatment.

21. The liquid crystal display device, according to claim 17, wherein the layer has a fluorocarbon chain.

22. The liquid crystal display device, according to claim 17, wherein the spherical spacer attached with the adhesive is discharged onto a region overlapping a light shielding film formed over the second substrate.

23. The liquid crystal display device, according to claim 17, wherein the spherical spacer is coated with the adhesive.

24. A liquid crystal display device comprising:
a substrate;
an organosilane film over the substrate;
a spherical spacer fixed on the organosilane film with adhesive;
an insulating film formed over the spherical spacer and the substrate; and
a liquid crystal over the insulating film,
wherein a diameter of the spherical spacer exceeds a width of the organosilane film in a direction parallel to the surface of the substrate over which the spherical spacer is fixed.

25. The liquid crystal display device, according to claim 24, wherein a diameter of the organosilane film is smaller than a diameter of the spherical spacer.

26. The liquid crystal display device, according to claim 24, wherein the insulating film is subjected to rubbing treatment.

27. The liquid crystal display device, according to claim 24, wherein the organosilane film has a fluorocarbon chain.

28. The liquid crystal display device, according to claim 24, wherein the spherical spacer attached with the adhesive is discharged onto a region overlapping a light shielding film formed over the substrate.

29. The liquid crystal display device, according to claim 24, wherein the spherical spacer is coated with the adhesive.

30. A liquid crystal display device comprising:
a first substrate;
a semiconductor element formed over the first substrate;
a liquid crystal over the semiconductor element;
an alignment film over the liquid crystal;
a spherical spacer over the alignment film;
an organosilane film over the spherical spacer and the alignment film; and
a second substrate over the organosilane film,
wherein the spherical spacer is fixed on the organosilane film with an adhesive, and
wherein a diameter of the spherical spacer exceeds a width of the organosilane film in a direction parallel to the surface of the first substrate over which the semiconductor element is formed.

31. The liquid crystal display device, according to claim 30, wherein a diameter of the organosilane film is smaller than a diameter of the spherical spacer.

32. The liquid crystal display device, according to claim 30, wherein the alignment film is subjected to rubbing treatment.

33. The liquid crystal display device, according to claim 30, wherein the organosilane film has a fluorocarbon chain.

34. The liquid crystal display device, according to claim 30, wherein the spherical spacer attached with the adhesive is discharged onto a region overlapping a light shielding film formed over the second substrate.

35. The liquid crystal display device, according to claim 30, wherein the spherical spacer is coated with the adhesive.

* * * * *

UNITED STATES PATENT AND TRADEMARK OFFICE
CERTIFICATE OF CORRECTION

PATENT NO.       : 8,098,361 B2
APPLICATION NO.  : 12/258866
DATED            : January 17, 2012
INVENTOR(S)      : Erika Takahashi et al.

It is certified that error appears in the above-identified patent and that said Letters Patent is hereby corrected as shown below:

Column 36, line 33, after "organosilane" insert -- film --

Column 37, line 47, before "direction" insert -- in a --

Column 38, line 8-9, before "adhesive" insert -- an --

Signed and Sealed this
Thirty-first Day of July, 2012

David J. Kappos
*Director of the United States Patent and Trademark Office*